US008418246B2

(12) United States Patent
McConnell

(10) Patent No.: US 8,418,246 B2
(45) Date of Patent: Apr. 9, 2013

(54) GEOGRAPHICAL THREAT RESPONSE PRIORITIZATION MAPPING SYSTEM AND METHODS OF USE

(75) Inventor: James T. McConnell, Keller, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 991 days.

(21) Appl. No.: 11/617,152

(22) Filed: Dec. 28, 2006

(65) Prior Publication Data

US 2007/0186284 A1    Aug. 9, 2007

Related U.S. Application Data

(63) Continuation-in-part of application No. 11/483,518, filed on Jul. 11, 2006, which is a continuation-in-part of application No. 11/477,852, filed on Jun. 30, 2006, now abandoned, and a continuation-in-part of application No. 11/482,934, filed on Jul. 10, 2006, which is a continuation-in-part of application No. 10/916,873, filed on Aug. 12, 2004, now Pat. No. 8,091,130, and a continuation-in-part of application No. 10/916,872, filed on Aug. 12, 2004, now Pat. No. 8,082,506.

(51) Int. Cl.
*G06F 17/00* (2006.01)
*G06F 17/30* (2006.01)

(52) U.S. Cl.
USPC ............... 726/22; 726/23; 726/25; 726/3

(58) Field of Classification Search ............ 726/22
See application file for complete search history.

(56) References Cited

U.S. PATENT DOCUMENTS

| 4,729,737 | A | 3/1988 | Reagan et al. |
| 5,515,285 | A | 5/1996 | Garrett et al. |
| 5,781,704 | A | 7/1998 | Rossmo |
| 5,848,373 | A | 12/1998 | DeLorme et al. |
| 5,940,598 | A | 8/1999 | Strauss et al. |
| 6,088,804 | A * | 7/2000 | Hill et al. .................. 726/25 |
| 6,163,604 | A | 12/2000 | Baulier et al. |
| 6,240,360 | B1 | 5/2001 | Phelan |
| 6,377,987 | B1 | 4/2002 | Kracht |
| 6,430,274 | B1 * | 8/2002 | Winstead et al. ........ 379/114.14 |
| 6,456,306 | B1 | 9/2002 | Chin et al. |
| 6,456,852 | B2 | 9/2002 | Bar et al. |
| 6,633,230 | B2 | 10/2003 | Grandin et al. |

(Continued)

OTHER PUBLICATIONS

The Digital Marauder's Map: A New Threat to Location Privacy; Xinwen Fu; Nan Zhang; Pingley, A.; Wei Yu; Jie Wang; Wei Zhao. Distributed Computing Systems, 2009. ICDCS '09. 29th IEEE International Conference on (1063-6927) (978-07695-3659-0) 2009. p. 589-596, year 2009.*

(Continued)

*Primary Examiner* — David Y Jung

(57) ABSTRACT

Systems and methods for mapping threats (or vulnerabilities to attacks) based on a correlation of location data, such as wireless location data or a physical location, with an network address associated with a threat are provided. In one aspect, methods and systems include receiving threat data, retrieving location data, correlating the threat data with the location data to create map data, and generating a map, based on the map data, displaying a geographical location of the threat. Threat locations may be determined for wired and wireless telecommunications systems.

25 Claims, 36 Drawing Sheets

U.S. PATENT DOCUMENTS

| | | |
|---|---|---|
| 6,691,161 B1 | 2/2004 | Cook et al. |
| 6,691,256 B1 | 2/2004 | Cook et al. |
| 6,813,777 B1 | 11/2004 | Weinberger et al. |
| 6,816,090 B2 | 11/2004 | Teckchandani et al. |
| 6,832,247 B1 | 12/2004 | Cochran et al. |
| 6,839,852 B1 | 1/2005 | Pantuso et al. |
| 6,900,822 B2 | 5/2005 | Germain et al. |
| 6,917,288 B2 * | 7/2005 | Kimmel et al. ............... 340/511 |
| 6,941,359 B1 | 9/2005 | Beaudoin et al. |
| 7,031,728 B2 | 4/2006 | Beyer |
| 7,082,535 B1 | 7/2006 | Norman et al. |
| 7,096,498 B2 | 8/2006 | Judge |
| 7,146,568 B2 | 12/2006 | Richardson |
| 7,227,950 B2 | 6/2007 | Faith et al. |
| 7,243,008 B2 | 7/2007 | Stockdale et al. |
| 7,260,844 B1 | 8/2007 | Tidwell et al. |
| 7,269,796 B1 | 9/2007 | Bayes et al. |
| 7,272,648 B2 | 9/2007 | Kawasaki et al. |
| 7,272,795 B2 | 9/2007 | Garding et al. |
| 7,337,222 B1 | 2/2008 | Du et al. |
| 7,337,408 B2 | 2/2008 | DeLuca et al. |
| 7,342,581 B2 | 3/2008 | Vinberg |
| 7,349,982 B2 | 3/2008 | Hannum et al. |
| 7,418,733 B2 | 8/2008 | Connary et al. |
| 2003/0018769 A1 | 1/2003 | Foulger et al. |
| 2003/0115211 A1 | 6/2003 | Chen et al. |
| 2003/0200347 A1 | 10/2003 | Weitzman |
| 2003/0232598 A1 | 12/2003 | Aljadeff et al. |
| 2004/0003285 A1 | 1/2004 | Whelan et al. |
| 2004/0044912 A1 | 3/2004 | Connary et al. |
| 2004/0117624 A1 | 6/2004 | Brandt et al. |
| 2004/0172466 A1 | 9/2004 | Douglas et al. |
| 2004/0233234 A1 | 11/2004 | Chaudhry et al. |
| 2004/0240297 A1 | 12/2004 | Shimooka et al. |
| 2005/0075116 A1 | 4/2005 | Laird et al. |
| 2005/0206513 A1 | 9/2005 | Fallon |
| 2006/0004497 A1 | 1/2006 | Bull |
| 2006/0041345 A1 | 2/2006 | Metcalf |
| 2007/0079243 A1 | 4/2007 | Leigh et al. |
| 2007/0204033 A1 | 8/2007 | Bookbinder et al. |
| 2009/0138353 A1 * | 5/2009 | Mendelson ..................... 705/14 |
| 2009/0172773 A1 * | 7/2009 | Moore ............................ 726/1 |
| 2009/0249460 A1 * | 10/2009 | Fitzgerald et al. ............... 726/7 |
| 2010/0311386 A1 * | 12/2010 | Edge et al. ................ 455/404.1 |
| 2011/0016536 A1 * | 1/2011 | O'Brien et al. ................ 726/28 |
| 2011/0099281 A1 * | 4/2011 | Bakker et al. ................ 709/228 |
| 2011/0183644 A1 * | 7/2011 | Gupta ....................... 455/404.2 |
| 2011/0189971 A1 * | 8/2011 | Faccin et al. ............... 455/404.1 |
| 2011/0195687 A1 * | 8/2011 | Das et al. .................. 455/404.2 |
| 2012/0252493 A1 * | 10/2012 | Siddeley et al. ............ 455/456.2 |

OTHER PUBLICATIONS

Security threats to signal classifiers using self-organizing maps; Clancy, T.C.; Khawar, A. Cognitive Radio Oriented Wireless Networks and Communications, 2009. CROWNCOM '09. 4th International Conference on (978-1-4244-3423-7); 2009. p. 1-6, year 2009.*

Brown et al., "Crime Mapping for Computer Crimes", Charlottesville, VA, Jun. 9, 2000.

* cited by examiner

| call_dt | duration | tariff_cost | orig_ani | country_name | term_ani | country_name | switch_id |
|---|---|---|---|---|---|---|---|
| 10/18/2006 16:11 | 1 | 0.01 | 215551212 | DOMESTIC | 2145552121 | DOMESTIC | SWT1 |
| 10/18/2006 16:11 | 2 | 0.02 | 215551213 | DOMESTIC | 2145552122 | DOMESTIC | SWT1 |
| 10/18/2006 16:12 | 3 | 0.03 | 215551214 | DOMESTIC | 2145552123 | DOMESTIC | SWT1 |
| 10/18/2006 16:13 | 4 | 0.04 | 215551215 | DOMESTIC | 2145552124 | DOMESTIC | SWT1 |
| 10/18/2006 16:14 | 5 | 0.05 | 215551216 | DOMESTIC | 2145552125 | DOMESTIC | SWT1 |

FIG. 1A

| Attack Name | Attacker / Victim |
|---|---|
| Telnet Attack | 10.1.1.1 |
| Witty Worm | 10.1.1.2 |
| Telnet Attack | 10.1.2.1 |

| ID | Caller ID | IP Address | Location |
|---|---|---|---|
| 100001 | 123-444-5555 | 10.1.1.1 | 37 23.516 - 122 02.625 |
| 100002 | 234-555-6666 | 10.1.1.2 | 42 21.423 - 109 03.543 |

FIG. 5

| Network Address | Physical Address | City | State | Zip Code |
|---|---|---|---|---|
| 02-69-8C-01-02-03 | 7979 Beltline Road | Irving | TX | 75039 |
| 02-69-8C-01-02-04 | 2319 E. Fowler Avenue | Tampa | FL | 33612 |

| Attack Name | Attacker / Vicitm | Address | City | State | ZIP | Status | Assigned to |
|---|---|---|---|---|---|---|---|
| RPC Bo | 10.1.1.1 | 7979 Beltline Road | Irving | TX | 75039 | Fixed | Tom |
| RPC Bo | 10.1.2.1 | 2319 E. Fowler Avenue | Tampa | FL | 33612 | Open | Fred |
| SSH Bo | 10.1.1.2 | Tampa | Irving | TX | 75039 | Fixed | Mary |

| ID | Authentication ID | Address | City | State | ZIP |
|---|---|---|---|---|---|
| 300001 | 02FY905D0102 | 7970 Beltline Road | Irving | TX | 75039 |
| 300002 | 01GH012F0501 | 2319 E. Flower Avenue | Tampa | FL | 33612 |

| ID | Caller ID | Address | City | State | ZIP |
|---|---|---|---|---|---|
| 300001 | 123-444-5555 | 7970 Beltline Road | Irving | TX | 75039 |
| 300002 | 234-555-6666 | 2319 E. Flower Avenue | Tampa | FL | 33612 |

| ID | Attack Name | Source IP Address | Destination IP Address |
|---|---|---|---|
| 200001 | RPC Bo | 10.1.1.1 | 10.1.2.1 |
| 200002 | SSH Bo | 10.1.1.2 | 10.1.2.1 |

| ID | Authentication ID | IP Address | Source |
|---|---|---|---|
| 100001 | 02FY905D0102 | 10.1.1.1 | 0 |
| 100002 | 01GH012F0501 | 10.1.1.2 | 1 |

| ID | Network Address | GPS Device ID | Latitude | Longitude | Dates |
|---|---|---|---|---|---|
| 300001 | 10.1.1.1 | BB4X01L456X | N49.25903 | W122.77428 | 2005-01-18 23:20:11 |

| ID | Attack Name | Attacker / Vicitm | Latitude | Longitude | Dates | Status | Assigned to |
|---|---|---|---|---|---|---|---|
| 700001 | RPC Bo | 10.1.1.1 | N49.25903 | W122.77428 | 2005-01-18 23:20:11 | Fixed | Tom |
| 700002 | RPC Bo | 10.1.2.1 | N49 15.542 | W122.46.457 | 2005-02-08 13:50:01 | Open | Mary |

FRAUD DATABASE — 2320

| COMPLAINT INFORMATION | SUBJECT TELEPHONE NUMBER — 2322 | ORIGIN/TERM — 2324 |
|---|---|---|
| Possible theft of services. | 123-456-7890 | ORIG |
| Repetitive threatening/nuisance calls. | 404-881-7000 | TERM |
| Repetitive threatening/nuisance calls. | 890-765-4321 | ORIG |

FIG. 23C

INVENTORY DATABASE

| CLLI INFORMATION | | | TELEPHONE NUMBER INFORMATION | | | PREMISE PHYSICAL ADDRESS |
|---|---|---|---|---|---|---|
| CLLI | X-COORD | Y-COORD | NPA | NXX | XXXX | |
| ABLNTXOR15T | 123456 | 789012 | 123 | 456 | 7890 | 123 MAIN ST., ABILENE, TEXAS |
| ABLNTXOR15T | 123499 | 789333 | 123 | 456 | 7891 | 1113 DUSTY RD., WYLIE, TEXAS |
| ABLNTXOR15T | 119543 | 784212 | 890 | 765 | 4321 | 10 BAYLOR DR., WACO, TEXAS |

2334, 2336, 2328, 2330, 2332, 2326

| BILLING DATABASE — 2338 | |
|---|---|
| TELEPHONE NUMBER | BILLING ADDRESS — 2340 |
| 123-456-7890 | 800 MARKET ST., NEW YORK, NEW YORK |
| 123-456-7891 | 1113 DUSTY RD., WYLIE, TEXAS |
| 890-765-4321 | P.O. BOX 1189, WACO, TEXAS |

FIG. 23D

| MAPPING DATABASE | | | | |
|---|---|---|---|---|
| COMPLAINT INFORMATION — 2342 | ADDRESS INFORMATION — 2344 | ORIGIN/ TERM — 2346 | RCD ID — 2348 | ASSOC ID — 2350 |
| Possible theft of services. | 123 MAIN ST., ABILENE, TEXAS | ORIG | 1 | |
| Repetitive threatening/nuisance calls. | 1201 WEST PEACHTREE ST., ATLANTA, GEORGIA | TERM | 2 | 3 |
| Repetitive threatening/nuisance calls. | 10 BAYLOR DR., WACO, TEXAS | ORIG | 3 | 2 |

FIG. 23E

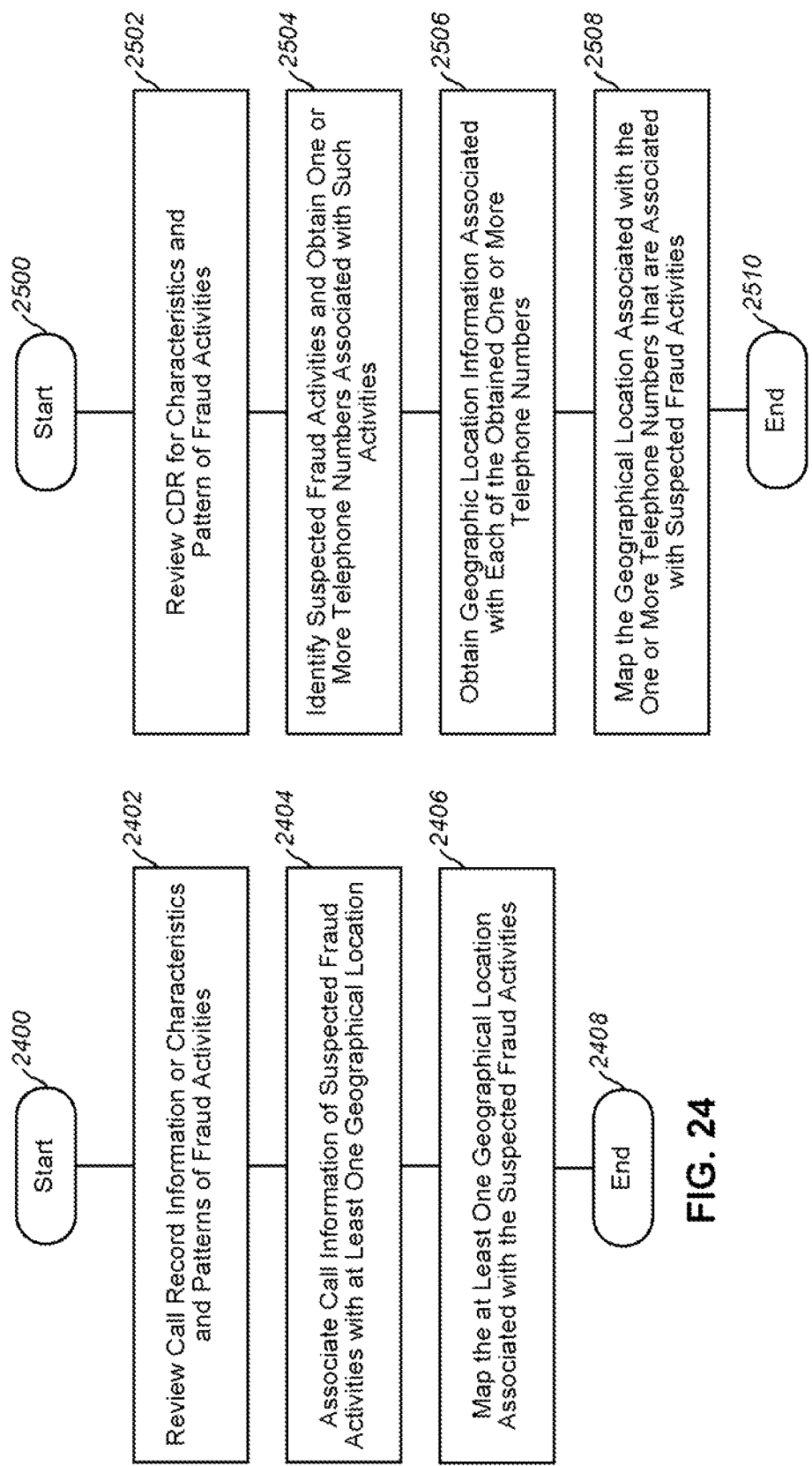

GEOGRAPHICAL THREAT RESPONSE PRIORITIZATION MAPPING SYSTEM AND METHODS OF USE

CROSS-REFERENCE TO RELATED APPLICATIONS

This is a continuation-in-part of prior U.S. patent application Ser. No. 11/483,518, filed Jul. 11, 2006, entitled "METHODS AND SYSTEMS FOR LOCATING SOURCE OF COMPUTER-ORIGINATED ATTACK BASED ON GPS EQUIPPED COMPUTING DEVICE," which is a continuation-in-part of prior U.S. patent application Ser. No. 11/477,852, filed Jun. 30, 2006, now abandoned entitled "METHODS AND SYSTEMS FOR LOCATING SOURCE OF COMPUTER-ORIGINATED ATTACK BASED ON GPS EQUIPPED COMPUTING DEVICE," and prior U.S. patent application Ser. No. 11/482,934, filed Jul. 10, 2006, entitled "GEOGRAPHICAL INTRUSION MAPPING SYSTEM USING TELECOMMUNICATION BILLING AND INVENTORY SYSTEMS," which itself is a continuation-in-part of prior U.S. patent application Ser. No. 10/916,873, filed Aug. 12, 2004, now U.S. Pat. No. 8,091,130 entitled "GEOGRAPHICAL INTRUSION RESPONSE PRIORITIZATION MAPPING SYSTEM," and prior U.S. patent application Ser. No. 10/916,872, filed Aug. 12, 2004, now U.S. Pat. No. 8,082,506 entitled "GEOGRAPHICAL VULNERABILITY MITIGATION RESPONSE MAPPING SYSTEM." The contents of all the aforementioned applications are fully incorporated herein by reference in their entirety.

BACKGROUND

When a threat in a computer or telecommunications systems is discovered, response resources must be directed to a physical location of the equipment associated with the threat. In practice, this requires extensive efforts to correlate existing threat information, router traffic information and physical location of the router and impacted/suspect device, dramatically reducing response time. For example, today, most responses to an intrusion require manual review of information such as TCP/IP switch logs, call data records, advanced intelligent network logs, etc., with the subsequent manual drawing of network "maps" and, most importantly, trying to mitigate an intrusion in a sequential or business prioritization order while these efforts are being undertaken. These response schemes do not allow for an organization's management to easily identify the geographical location of the threat(s) and the location(s) at which resources are most needed. Furthermore, current response schemes do not allow an organization's response or management team timely access to geographical view(s) of the location of the threats together with information relating to the status or progress of the response to the threats.

In one instance, a digital or cyber threat may take the form of a direct attack, an introduction of malicious software such as virus and worm, or other intrusion generated by a computing device incorporating or being able to be located by one or more Global Positioning System ("GPS") receivers. Accordingly, a PDA, a Smartphone, or a laptop with embedded and/or integrated GPS capabilities can be a source of a computer-originated attack, for example, a computer-triggered attack to remotely activate explosives. Likewise, certain wireless devices may be able to be located with some degree of specificity either through embedded GPS receivers or through GPS receivers incorporated into the towers/antennas that such devices access during an uplink. Both, a device having an incorporated GPS receivers and a device able to be located using stationary GPS receivers are referred to herein as a "GPS Device."

A GPS device may be used to trigger a computer-originated attack in many ways. In one scenario, a GPS device may initiate a computer-originated attack directly, for example, by starting a digital or cyber attack. Alternatively, a GPS device, when vulnerable, may be at the receiving end of a first digital or cyber attack. Once the vulnerable GPS device is compromised, it may then fall under the influence of the first digital or cyber attack and initiate a computer-originated attack.

Fortunately, a GPS device may capture its location information via a protocol such as National Marine Electronics Association ("NMEA") 0183. The captured location information can then be transmitted via another protocol such as TCP or UDP to an incident response environment. For example, an existing security software vendor, such as Antivirus, may identify a digital or cyber attack, detect that the device is also receiving GPS information, and subsequently transmit the attack information and GPS information back to an incident response environment.

Response resources can be directed to a physical location of a GPS device under attack. In practice, however, this requires extensive efforts to correlate existing threat data or vulnerability data with GPS data collected and subsequently transmitted, thus reducing response time similar to a physical disaster or attack. So, even with the availability of GPS data, most current responses to an intrusion or vulnerability require manual review of TCP/IP switch information, manual drawing of network "maps" and, most importantly, trying to mitigate an intrusion or vulnerability in a sequential order, as described above.

In other instances, the hacking of networks such as those now ubiquitous in billing and financial systems, viruses launched against computer systems, intrusions onto computer hosts and networks, fraudulent activities resulting in the theft of services such as telephone service (wired or wireless), cable television, Internet access, etc. are just a few examples of more technologically-sophisticated crimes that are not easily mapped to a physical location.

Businesses and organizations have also used technology in an attempt to thwart these technologically-advanced crimes. One method is through the detection of anomalies in data associated with business transactions, such as the detection of unauthorized or malicious users on computer hosts and networks, often called intrusion detection and fraud detection systems.

For example, computer applications are created having several layers with each layer including detective, preventive, and corrective controls. At the business transaction layer, the detective controls apply business rules used for supervisory type reports that may be voluminous depending upon the nature of the business and the number of transactions occurring. Though there may exist a geographical correlation between physical, network and computer-related crimes, such correlation may not be apparent from review of numerous discrete reports from various sources and of varying types and formats while simultaneously trying to mitigate the crime and respond to them.

These response schemes do not allow for an organization's management to easily identify the geographical location of the problem(s) and the location(s) at which resources are most needed. Furthermore, current response schemes do not allow an organization's response or management team timely access to geographical view(s) of the location of the crimes together with information relating to the status or progress of the response to the threat.

BRIEF DESCRIPTION OF THE DRAWINGS

FIG. 1A is a example of records in a CDR database;

FIG. 4 is an exemplary screenshot of records in a threat database containing threat information;

FIG. 5 is an exemplary screenshot of records in an CDR database;

FIG. 6 is an exemplary screenshot of records in a location database;

FIG. 7 is an exemplary screenshot of records in a map database containing information for mapping threats;

FIG. 11A is a first example of records in a customer database;

FIG. 11B is a second example of records in a customer database;

FIG. 15 is a second example of records in a threat database;

FIG. 16 is an example of records in an authentication database;

FIG. 20 is an exemplary screenshot of GPS data;

FIG. 21 is an exemplary screenshot of records in a mapping database containing information for mapping threats;

FIG. 23B is an exemplary database record for a fraud database;

FIG. 23C illustrates sample records from an exemplary inventory database that may be used in an embodiment according to the present invention;

FIG. 23D illustrates sample records from an exemplary billing database that may be used in an embodiment according to the present invention;

FIG. 23E is an exemplary mapping database structure and exemplary records contained therein;

FIG. 24 is an overview flowchart used to explain the steps of an exemplary process for geographic mapping of fraud activities based on information obtained from records related to telephone calls and location information correlation;

FIG. 25 is a flowchart used to explain the steps of an exemplary process for geographic mapping of fraud activities based on CDR and location information correlation;

DETAILED DESCRIPTION OF PREFERRED EMBODIMENTS

Figure 1:
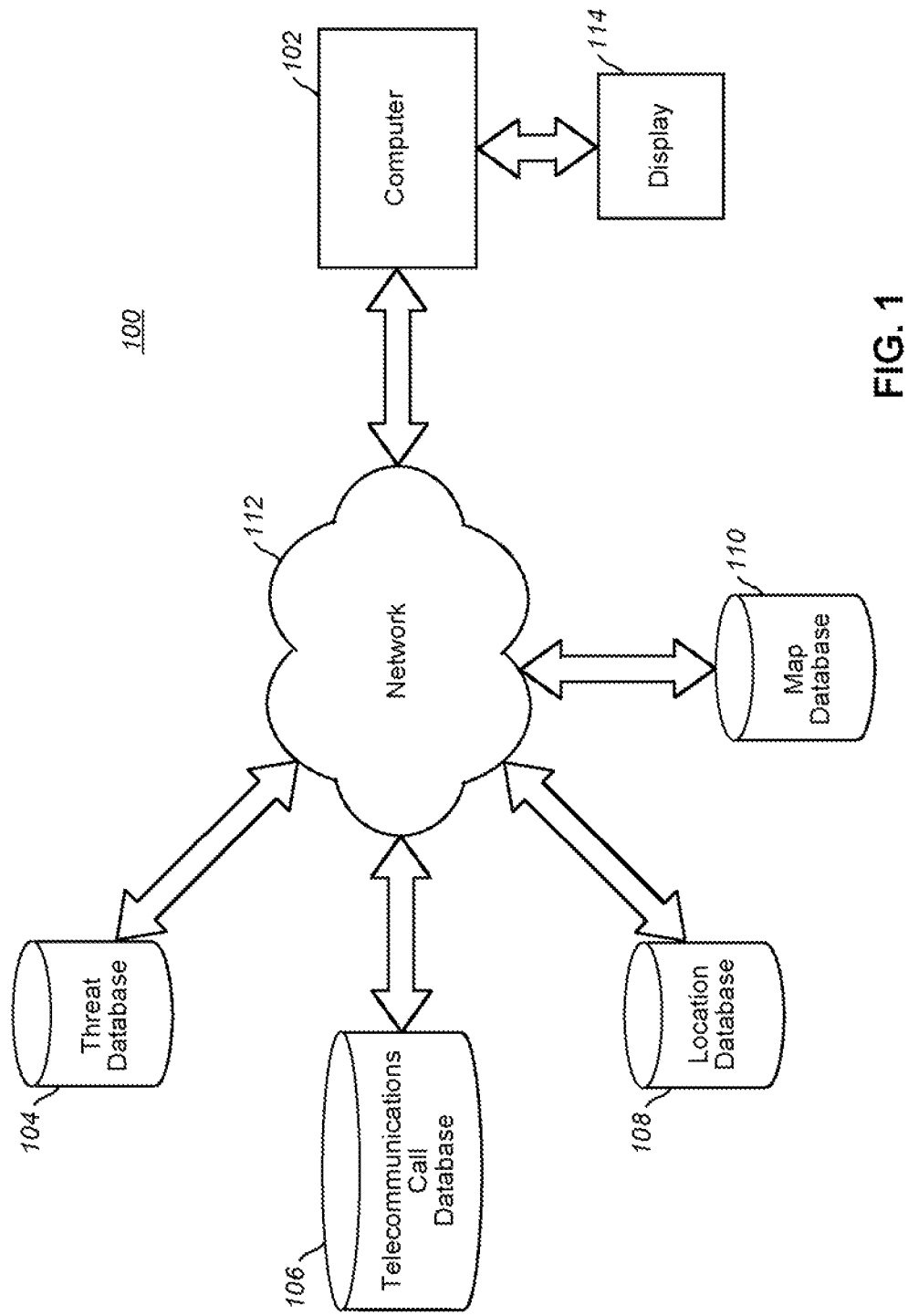
FIG. 1 is a block diagram of an exemplary environment in which the systems and methods of the present invention may be implemented.

Reference will now be made in detail to the exemplary embodiments, examples of which are illustrated in the accompanying drawings. Wherever possible, the same reference numbers will be used throughout the drawings to refer to the same or like parts. It is to be understood that the following detailed description are exemplary and explanatory only and are not restrictive of the invention, as claimed.

The preferred embodiments may be implemented as a method, a data processing system, or a computer program product. Accordingly, preferred embodiments of the present invention may take the form of an entirely hardware embodiment, an entirely software embodiment, or an embodiment combining software and hardware aspects. Furthermore, implementations of the preferred embodiments may take the form of a computer program product on a computer-readable storage medium having computer-readable program instructions (e.g., computer software) embodied in the storage medium. More particularly, implementations of the preferred embodiments may take the form of web-implemented computer software. Any suitable computer-readable storage medium may be utilized including hard disks, CD-ROMs, optical storage devices, or magnetic storage devices.

The preferred embodiments according to the present invention are described below with reference to block diagrams and flowchart illustrations of methods, apparatuses (i.e., systems) and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

As used herein, a "fraud" is an unauthorized use of an electronic network to use deception to obtain a service, good or other thing of value from another in reliance upon the deception.

As used herein, an "intrusion" is an unauthorized use, attempt, or successful entry into a digital, computerized, or automated system, requiring a response from a human administrator or response team to mitigate any damage or unwanted consequences of the entry. For example, the introduction of a virus and the unauthorized entry into a system by a hacker are each "intrusions" within the spirit of the present invention. An "intrusion response" is a response by systems or human operators to limit or mitigate damage from the intrusion or prevent future intrusions. Within the spirit and scope of the present invention, "intrusions" of many types and natures are contemplated.

In addition, as used herein, a "vulnerability" is a prospective intrusion, that is, a location in a digital, computerized, or automated system, at which an unauthorized use, attempt, or successful entry is possible or easier than at other points in the system. For example, a specific weakness may be identified in a particular operating system, such as Microsoft's Windows™ operating system when running less than Service Pack 6. Then, all computers running the Windows operating system with less than Service Pack 6 will therefore have this vulnerability. This and other vulnerabilities may be identified by commercially available software products. While methods of locating such vulnerabilities are outside the scope of the present invention, any of the vulnerabilities identified or located by such software products, now known or later developed, are within the spirit of the present invention.

In addition, as used herein, a "mitigation response" is the effort undertaken to reduce unwanted consequences or to eliminate the intrusion. For example, such a response may entail sending a human computer administrator to the site of the location to update software, install anti-virus software, eliminate a virus, or perform other necessary tasks. In addition, a response may entail installing a patch to the vulnerable computer, such as across a network. The present invention does not contemplate any specific responses. Instead, any response to an intrusion requiring the organization of resources is within the scope and spirit of the present invention.

For the ease of discussion, the following discussion will focus on the systems and methods of the present invention in terms of mapping "threats." Reference to "threats" includes frauds, intrusions and vulnerabilities. Similarly, subsequent reference to "intrusions" includes both intrusions and vulnerabilities as described above.

FIG. 1 is a block diagram of one exemplary environment in which the systems and methods of the present invention may be implemented. As shown in FIG. 1, system 100 employs mapping computer 102. In addition, system 100 may also employ databases such as threat database 104, telecommunications call (or call detail record (CDR)) database 106, location database 108, and map database 110, each in electronic communication with mapping computer 102. System 100 also includes a display 114, such as a video display, for displaying the geographic information correlated and mapped by computer 102 using the methods discussed herein, and a network 112, in electronic communication with computer 102, in which the threats may occur.

In one embodiment, threat database 104 may contain information identifying a threat in the system, such as, for example, the threat type, description, and point of possible entry or exit (i.e., network point or computer). As shown in FIG. 1A, CDR database 106 for a plain old telephone service (POTS) may contain records identifying a plurality of telecommunications calls by date/time, duration, tariff cost, originating and terminating telephone numbers and switch identification. In instances in which the CDR database stores information related to telecommunications calls supported by a cellular or other wireless network, the CDR records may also include wireless location data, such as location data associated with the cellular tower servicing the telecommunications call or GPS data provided by a mobile terminal that originates or receives the telecommunications call. See, for example, FIG. 5 which illustrates other CDR records for telecommunications calls supported by a cellular or other wireless network. Location database 108 may contain geographical information such as the physical address or wireless location, e.g., GPS, coordinates of a potential point of entry or exit. Finally, map database 110 may correlate and contain information from the threat, CDR, and location databases as described below to map the threats.

Figure 2:
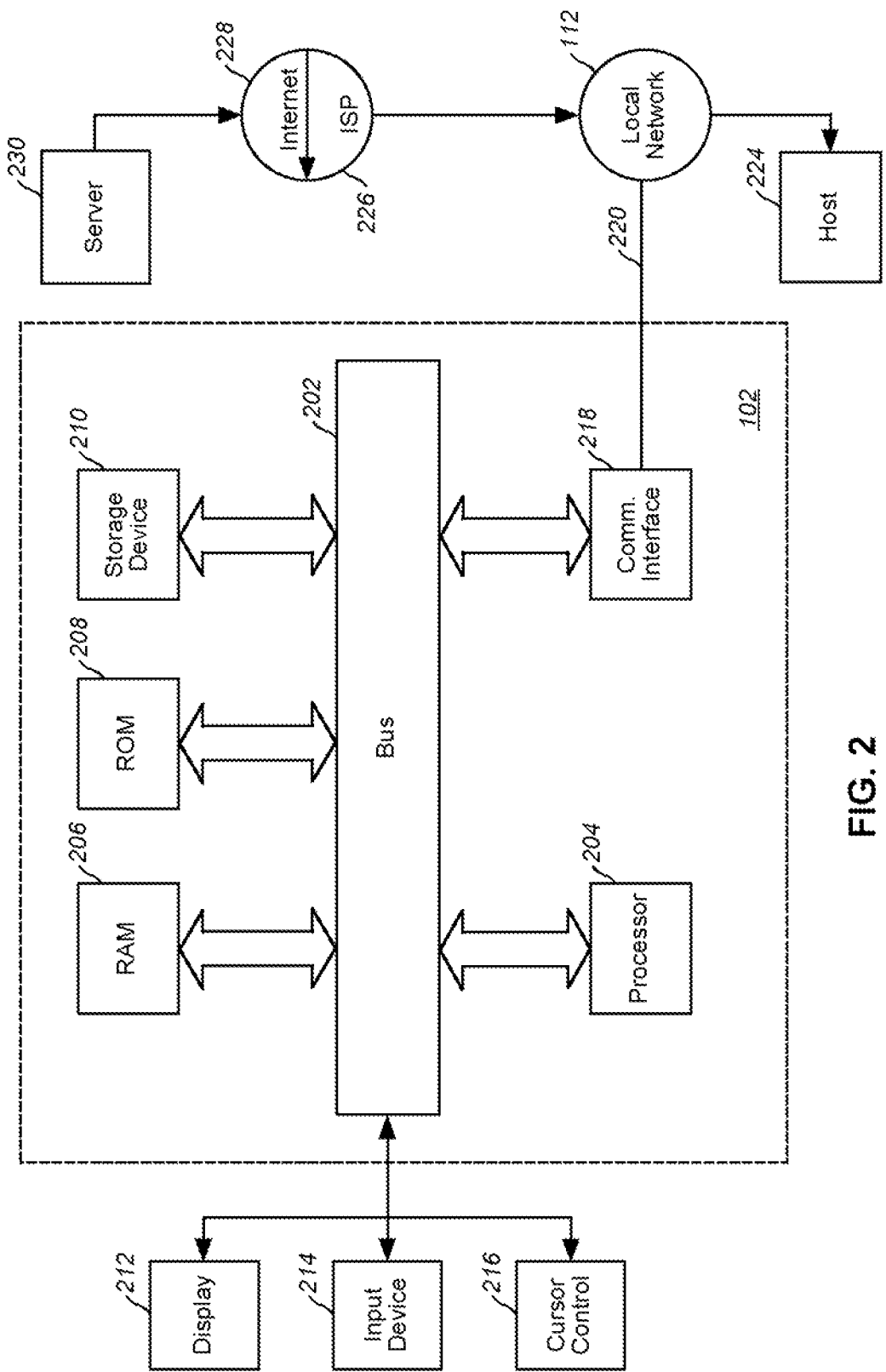
FIG. 2 is a block diagram of an exemplary embodiment of a mapping computer.

FIG. 2 is a block diagram illustrating an exemplary mapping computer 102 for use in system 100, consistent with the present invention. Computer 102 includes a bus 202 or other communication mechanism for communicating information, and a processor 204 coupled to bus 202 for processing information. Computer 102 also includes a main memory, such as a random access memory (RAM) 206, coupled to bus 202 for storing information and instructions during execution by processor 204. RAM 206 also may be used for storing temporary variables or other intermediate information during execution of instructions to be executed by processor 204. Computer system 102 further includes a read only memory (ROM) 208 or other storage device coupled to bus 202 for storing static information and instructions for processor 204. A mass storage device 210, such as a magnetic disk or optical disk, is provided and coupled to bus 202 for storing information and instructions.

Computer 102 may be coupled via bus 202 to a display 212, such as a cathode ray tube (CRT), for displaying information to a computer user. Display 212 may, in one embodiment, operate as display 114.

Computer 102 may further be coupled to an input device 214, such as a keyboard, coupled to bus 202 for communicating information and command selections to processor 204. Another type of user input device is a cursor control 216, such as a mouse, a trackball or cursor direction keys for communicating direction information and command selections to processor 204 and for controlling cursor movement on display 212. Cursor control 216 typically has two degrees of freedom in two axes, a first axis (e.g., x) and a second axis (e.g., y), which allow the device to specify positions in a plane.

According to one embodiment, computer 102 executes instructions for geographic mapping of threat information. Either alone or in combination with another computer system, computer 102 thus permits the geographic mapping of threats in response to processor 204 executing one or more sequences of instructions contained in RAM 206. Such instructions may be read into RAM 206 from another computer-readable medium, such as storage device 210. Execution of the sequences of instructions contained in RAM 206 causes processor 204 to perform the functions of mapping computer 102, and/or the process stages described herein. In an alternative implementation, hard-wired circuitry may be used in place of, or in combination with software instructions to implement the invention. Thus, implementations consistent with the principles of the present invention are not limited to any specific combination of hardware circuitry and software.

The term "computer-readable medium" as used herein refers to any media that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as RAM 206. Transmission media includes coaxial cables, copper wire and fiber optics, including the wires that comprise bus 202. Transmission media may also take the form of acoustic or light waves, such as those generated during radio-wave and infra-red data communications.

Common forms of computer-readable media include, for example, a floppy disk, flexible disk, hard disk, magnetic tape, or any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer may read. For the purposes of this discussion, carrier waves are the signals which carry the data to and from computer 102.

Various forms of computer-readable media may be involved in carrying one or more sequences of one or more instructions to processor 204 for execution. For example, the instructions may initially be carried on the magnetic disk of a remote computer. The remote computer may load the instructions into a dynamic memory and send the instructions over a telephone line using a modem. A modem local to computer 102 may receive the data on the telephone line and use an infra-red transmitter to convert the data to an infra-red signal. An infra-red detector coupled to bus 202 may receive the data carried in the infra-red signal and place the data on bus 202. Bus 202 carries the data to main memory 206, from which processor 204 retrieves and executes the instructions. The instructions received by main memory 206 may optionally be stored on storage device 210 either before or after execution by processor 204.

Computer 102 may also include a communication interface 218 coupled to bus 202. Communication interface 218 provides a two-way data communication coupling to a network link 220 that may be connected to network 112. Network 112 may be a local area network (LAN), wide area network (WAN), or any other network configuration. For example, communication interface 218 may be an integrated services digital network (ISDN) card or a modem to provide a data communication connection to a corresponding type of telephone line. Computer 102 may communicate with a host 224 via network 112. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. In this embodiment, network 112 may communicate with an Internet Service Provider (ISP) 226. For example, network link 220 may provide a connection to data equipment operated by the ISP 226. ISP 226, in turn, provides data communication services from another server 230 or host 224 to computer 102. Network 112 may use electric, electromagnetic or optical signals that carry digital data streams.

Computer 102 may send messages and receive data, including program code, through network 112, network link 220 and communication interface 218. In this embodiment, server 230 may download an application program to computer 102 via network 112 and communication interface 218. Consistent with the present invention, one such downloaded application geographically maps vulnerability or threat information, such as, for example, by executing methods 300 and/or 900, to be described below in reference to FIGS. 3 and 9. The received code may be executed by processor 204 as it is received and/or stored in storage device 210, or other non-volatile storage for later execution.

Although computer system 102 is shown in FIG. 2 as connectable to server 230, those skilled in the art will recognize that computer system 102 may establish connections to multiple servers on Internet 228 and/or network 112. Such servers may include HTML-based Internet applications to provide information to computer system 102 upon request in a manner consistent with the present invention.

Returning to FIG. 1, display 114 may, in one embodiment, be implemented as display 212 (FIG. 2), directly connected to computer 102. In an alternative embodiment, display 114 may be connected to computer 102 via network 112. For example, display 114 may be a display connected to another computer on network 112, or may be a stand-alone display device such as a video projector connected to computer 102 via network 112.

In addition, databases 104, 106, 108, and 110 may each reside within computer 102 or may reside in any other location, such as on network 112, so long as they are in electronic communication with computer 102.

In one embodiment, location database 108 is a static database in which the physical location of routers or network points is located. Such location information may include router (IP/MAC) address, and router (or network point) physical address (geographic location), such as GPS coordinates. The CDR database 106 and location database 108 may be kept in accordance with any now known or later developed methods for implementing and maintaining call detail records, or physical location information, respectively.

In an alternative embodiment, databases 104, 106, 108, and 110, may be implemented as a single database, or may be implemented as any number of databases. For example, system 100 may include multiple threat, CDR, location, and map databases. Furthermore, in one embodiment, databases 104, 106, 108, and 110 may be implemented as a single database containing all of the described information. One of ordinary skill in the art will recognize that system 100 may include any number (one or more) of databases so long as the information discussed herein may be retrieved and correlated as discussed herein.

Finally, databases 104, 106, 108, and 110 may be implemented using any now known or later developed database schemes or database software. For example, in one embodiment, each of the databases may be implemented using a relational database scheme, and/or may be built using Microsoft Access™ or Microsoft Excel™ software. While, more likely, one or more databases will be implemented to take into account other factors outside the scope of the present invention, any implementation (and location) of the present databases is contemplated within the scope and spirit of the present invention.

Figure 3:
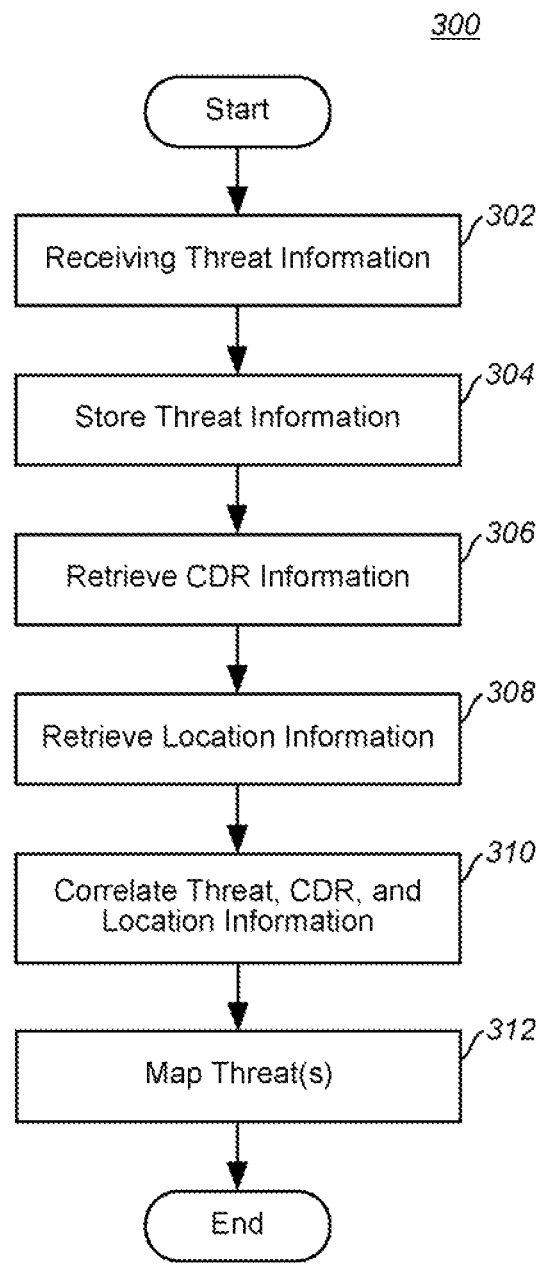
FIG. 3 is a flowchart of an exemplary method for geographically mapping response information.

FIG. 3 shows a method 300 for execution, such as by computer 102, for geographic mapping of threat information, consistent with one embodiment of the present invention. Method 300 begins by receiving threat information, stage 302, such as from a computer administrator, as the output of software designed to detect threats, from a threat detection system, router, network management system, security information manager, or from any other source. In one embodiment, the threat information may include an identification (such as the IP address) of the computer where the threat started or ended, the name and description of the threat, and possibly other data. Upon receipt of the threat information, it is stored in threat database 104 at stage 304. FIG. 4 shows one embodiment of threat information 400 within threat database 104.

Returning to FIG. 3, in instances in which the computer where the threat started or ended is a computer that is configured to communicate via cellular or other wireless networks, computer 102 then retrieves, for computers or network points (hereinafter generally referenced as "computers") at which a threat started or ended, CDR information for that computer from CDR database 106, at stage 306. In one embodiment, the threat information (such as the IP address) may be used as a key to retrieve the appropriate record from CDR database 106. The CDR information may include the IP address of a computer that participates in a telecommunications call, such as an exchange of messages, a transfer of data or the like, wireless location data identifying the location of the computer during a respective telecommunications call, and other information relating to the telecommunications call and/or the computer at which the threat started or ended, as necessary. As noted, the wireless location data may be location data associated with the cellular tower servicing the telecommunications call or GPS data provided by the mobile device.

FIG. 5 shows one exemplary embodiment of the CDR information within CDR database 106.

In instances in which the wireless location data identifies a cellular tower servicing the telecommunications call, computer 102 may also retrieve geographic location information for the cellular tower from location database 108, at stage 308. In one embodiment, the threat data (such as IP address) and/or the CDR data (such as the identification of the cellular tower) may be used as a key to identify a record corresponding to the location database record(s), corresponding to the cellular tower. The location information retrieved may include such information as the physical location (e.g., mailing address or GPS coordinates) for the identified cellular tower. FIG. 6 shows one exemplary embodiment 600 of the location information within location database 108.

As described above and in greater detail below, the system and method of one embodiment receive threat information that includes a network address, such as an IP address, associated with a device affiliated with the threat, such as a device at which the threat began or ended, and then identify wireless location data, e.g., GPS data or data identifying a cellular tower and its location, associated with the device based upon its network address. In another embodiment, the system and method receive threat information, e.g., indicative of fraud or potential fraud, that includes the telephone number of a device affiliated with the threat, such as the calling telephone number or the called telephone number, and then identify the location of the device based upon an address associated with the telephone number in a customer database, such as a billing or inventory database.

Once this information has been retrieved from databases 104, 106, and 108, it is stored in map database 110 at stage 310. Within map database 110, the retrieved information is preferably correlated such that all information for a particular threat is stored in a record for that threat. For example, FIG. 7 shows an exemplary screenshot 700 of records of map information for mapping threats, such as may be stored in map database 110. As shown, map database records may contain the threat information including the network address (such as the IP address or telephone number), and the physical location, such as the mailing address (from location database 108 or a customer database) or GPS information (from CDR database 106). In addition, map database records may also include a status of the threat and an indication of the response person or team assigned to respond to the threat.

Upon correlating this information within map database 110, computer 102 then maps the location of the threat at stage 312. In one embodiment, the location information for each record is imported into a commercially available mapping program such as MapPoint™ by Microsoft, to visually locate the threat points with network 112 on a map. In one embodiment, the map may represent each of the threats as a symbol on the map, for example, as a push pin. An exemplary map 800 using this push pin approach is shown as FIG. 8. Within map 800, each pushpin 802, 804, shows the location of a point of threat requiring a response.

Using map 800, response teams or system administrators will be able to identify "pockets" of threats and will be able to better prioritize and more efficiently schedule response personnel to respond and mitigate or eliminate the threat, based on geographic location. In addition, by continually updating the map and watching it change over time, system operators will be able to geographically view the spread, if any, of a threat. Furthermore, by also tracking system updates, the administrator will be able to identify new entry points.

Figure 9:
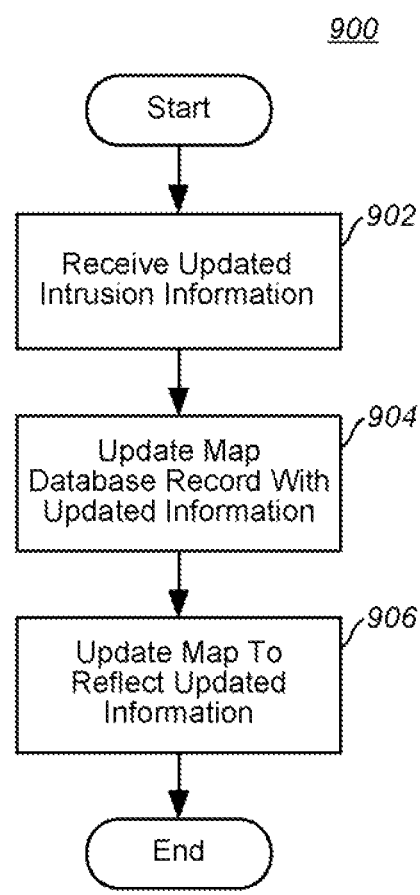
FIG. 9 is a flowchart showing an exemplary method for updating a geographic map with progress information.

FIG. 9 shows a flowchart of a method 900 for updating the geographic map with progress information. Method 900 begins with a response team or system administrator sending an update to the system to advise of a new status of a threat at stage 902. For example, the response team may advise the system that the intruded computer must be replaced, and be rendered inactive until it is replaced, (i.e., the threat is "open") or may advise the system that the intruded computer has been upgraded and is no longer compromised.

Once this information is received, the map database record for the identified threat is updated at stage 904. For example, each threat record in the database may contain a field to identify the status of the threat (see FIG. 7). Possible status indicators may reflect that the threat is "new," "open" (i.e., not yet responded to), "assigned to a response team," "closed" (i.e., responded to and fixed), or any other status that may be of use to the organization for which the system has been implemented.

Once the map database record has been updated, map computer 102 can update map 800 to reflect the updated status of the threat. For example, one way that map 800 can show the status information is to display color-coded push pin symbols to reflect the status. In one embodiment, a red push pin may signify an "open" or "new" threat, a yellow push pin may signify a threat that has been assigned, but not yet fixed, and a green push pin may signify a closed threat. By mapping this information together with the locations of the threats, administrators can better track the progress of their response teams, and more fluidly schedule responses to new threats as they arise.

Any symbol or representation may be used to identify a threat on the map, including, but not limited to, a push-pin symbol. These symbols and representations may be used to identify the quantity of threats in that area of the map, such as by varying the color of the symbol to identify such quantity. In addition, the symbol or representation may be linked to the underlying data such that a user, using an input device, may select a symbol on the map causing computer 102 to display the status, quantity, address, or other information corresponding to the selected symbol.

The preferred threat mapping systems and methods may applied in various environments using various equipment and data analogous to the described above. Described below are various specific implementations thereof in the context of certain network environments.

Figure 10:
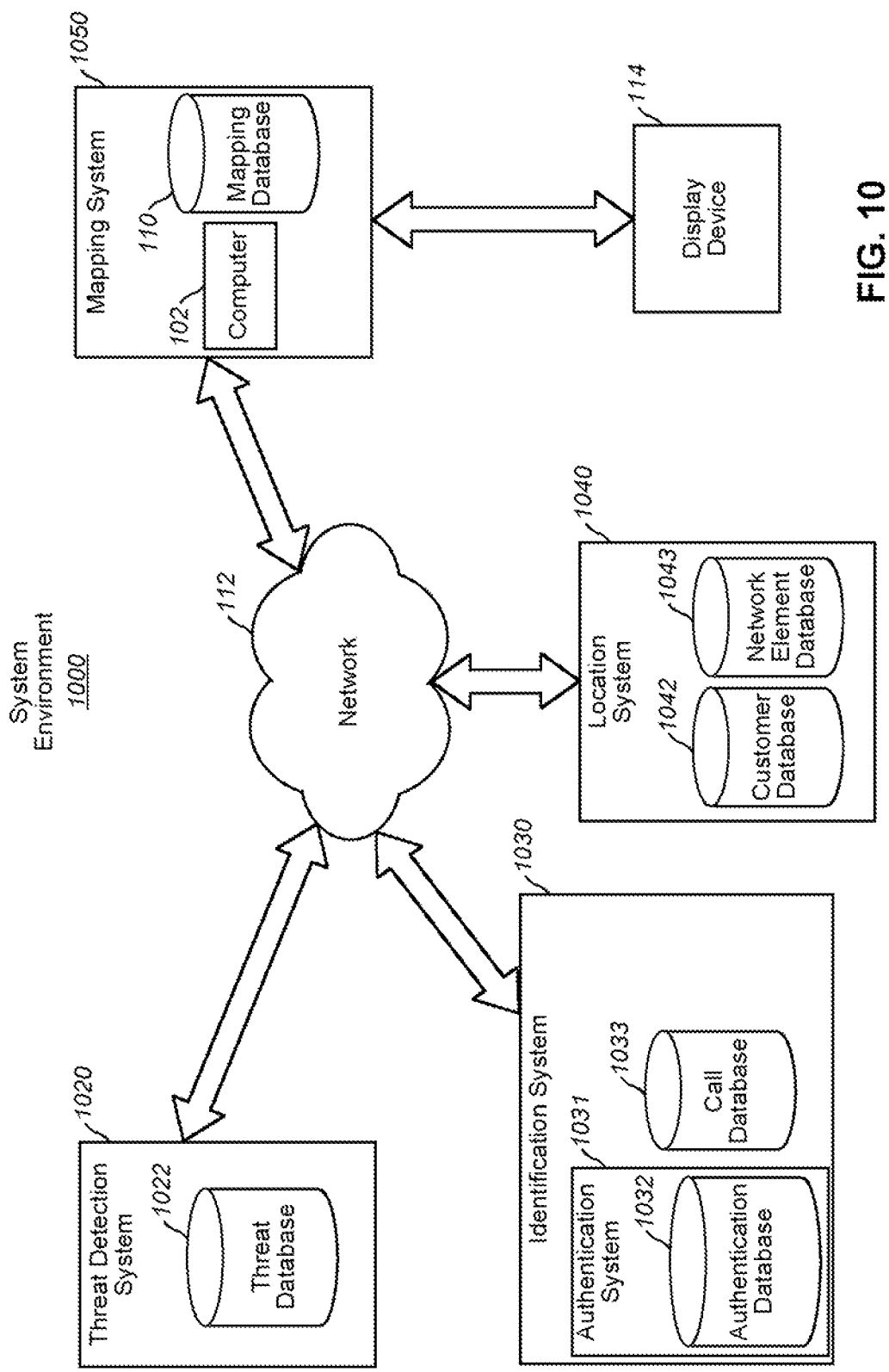
FIG. 10 is a block diagram of a second exemplary environment in which systems and methods consistent with the present invention may be implemented.

FIG. 10 is a block diagram of a second exemplary environment 1000 in which preferred systems and methods consistent with the present invention may be implemented. The number of components in environment 1000 is not limited to what is shown and other variations in the number of arrangements of components are possible. The components of FIG. 10 may be implemented through hardware, software, and/or firmware.

As shown in FIG. 10, environment 1000 may include a threat detection system ("TDS") 1020, an identification system 1030, a location system 1040, and a mapping system 1050, each directly or indirectly in electronic communication with the other systems. Similarly to the environment 100 of FIG. 1, such communication may be conducted through a network 112 as described above. Also similarly to the environment 100 of FIG. 1, environment 1000 also includes a display device 114, such as a video display, for displaying the geographical threat information correlated and mapped by the mapping system 1050 using the methods discussed herein.

The TDS 1020 includes various systems including, for example, firewall logs, that can provide information related to network threats, vulnerabilities or other security threats. For example, the TDS may identify attacks and contain information such as the attack type, description, and impacted device information such as a network device, e.g., an IP address, of the impacted device (e.g., a router, a connected computer). TDS 1020 may also include threat database 1022, which stores threat information, such as the aforementioned attack-related information (e.g., threat type, threat description, and impacted device information such as a network address or telephone number of the impacted device). FIG. 4 illustrates one example of threat information 400 that may be stored in threat database 1022. FIG. 15 illustrates a second example of threat information 1500 that may be stored in threat database 1022. Other examples are of course possible.

Exemplary identification system 1030 may include various systems that can provide information useful for identifying network points (e.g., network equipment, connected computers, users, etc.) within environment 1000. For example, in environment 1000, identification system 1030 includes an authentication system 1031. Authentication system 1031 may be implemented, for example, through the RADIUS Authentication Protocol, to verify that a user is indeed authorized to operate in environment 1000. RADIUS is used commonly with embedded network devices such as routers, modem servers, and switches. A typical RADIUS packet includes fields such as code, identifier, length, authenticator, and attributes. In one example, a RADIUS packet may contain attributes such as username and password, which may be used to identify a particular user in the network. When a RADIUS packet is sent from a network point in a telecom system, it may also contain telephony attributes such as a calling party telephone number (e.g., "Caller ID" information).

A user or client may initiate an authentication process by sending a RADIUS Access-Request packet to a server in authentication system 1031. The server will then process the packet and send back a response packet to the client if the server possesses a shared secret for the client. Once the authentication is confirmed by the client, authentication system 1031 may store pertinent authentication data in authentication database 1032. Authentication data may contain, for example, an IP address, user information, caller ID information and authentication identification (e.g., crypto-keys). Authentication database 1032 thus may serve as a source for identification information for network points in environment 1000. FIG. 16 illustrates one example of records storing authentication data 1600 in authentication database 1032. Other examples are of course possible.

In some implementations (e.g., telecom networks), identification system 1030 may also include a call database 1033, which may store data related to call transactions, such as calling party telephone number, called party telephone number, other network addresses associated with a caller or network equipment used in a call (e.g., MINs, IP/MAC addresses), etc. For example, in a Voice over IP system, an IP address may be associated with a conventional telephone number, in order to perform proper call routing. Call database 1033 thus may serve as a source for identification information for network points in environment 1000. FIG. 5 illustrates one example of records storing call data in a call database 1033. Other examples are of course possible.

Exemplary location system 1040 includes various systems that are useful in identifying physical (geographic) locations associated with network points in environment 1000. For example, location system 1040 may include a customer database 1042, which may contain geographical information such as the physical address or geographic coordinates (e.g., mailing address, latitude and longitude) for the customers (or other parties) that use network 112. Information in customer database 1042 may be identified by various data that is associated with a particular customer entity, such as authentication data (illustrated in FIG. 11A as location data 1100), caller ID information (illustrated in FIG. 11B as location data 1101), a combination thereof and/or other customer-specific identifiers. Location system 1040 may also include a network element database 1043, which may comprise the aforementioned location database 108 (see FIG. 1, FIG. 6) and/or other databases that track physical locations of network switching elements.

Exemplary mapping system 1050 may be configured to correlate data from the various databases described above, and to map threats accordingly (as further described below). Mapping system 1050 may be implemented using computer 102, map database 110 and display 114 as described above (see FIG. 2). Computer 102 may be configured to execute instructions that perform the various operations associated with the exemplary threat mapping processes described herein.

As was the case for environment 100, network security system 1020, identification system 1030, location system 1040 and mapping system 1050 of environment 1000 may be interconnected directly or indirectly, with or without network 112. Moreover, elements of each of these systems may be distributed across multiple computing platforms, or concentrated into only one or a few computing platforms. For example, network security system 1020, identification system 1030, and location system 1040 may each reside within mapping system 1050, or may reside in any other location in any combination, so long as they are in electronic communication with mapping system 1050. Likewise the various databases may be implemented as a single database, or may be implemented as any number of databases. For example, one of ordinary skill in the art will recognize that environment 1000 may include multiple authentication databases, such as having one for each geographical region served by environment 1000. Similarly, environment 1000 may include multiple threat, authentication, call, customer location and/or mapping databases, or a single database containing all of the described information. Any implementation (and configuration) of the system environment described herein is contemplated.

Figure 13:
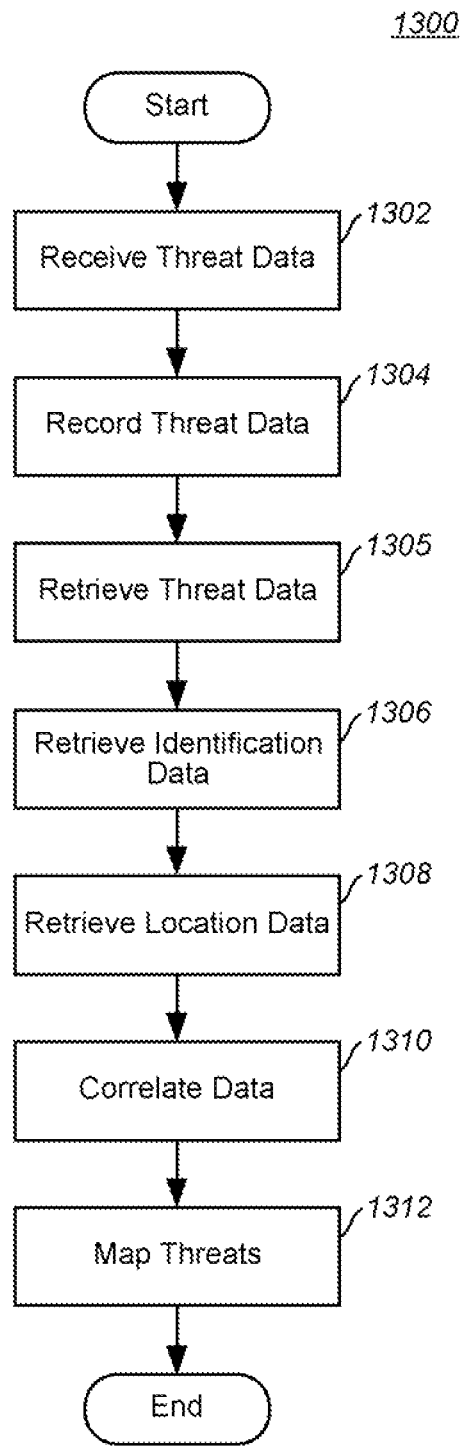
FIG. 13 is a flowchart of an exemplary method for geographically mapping threat response.

FIG. 13 shows a preferred method 1300 which may be performed in conjunction with mapping system 1050 to geographically correlate and map threats in environment 1000. Method 1300 is similar in many respects to method 300 (see FIG. 3), and is presented here as specifically applicable to the exemplary environment 1000. Method 1300 begins (similarly to method 300 of FIG. 3) by receiving threat data at stage 1302 and recording the threat data in threat database 1022 in stage 1304. As noted above, threat data may be any information describing or identifying a threat. Threat data can be received from a computer administrator, from the output of software designed to detect or discover threats from TDS or firewall logs, from a network management system, from a security information manager, or from any other source. FIGS. 4 and 15 illustrate examples of threat data recorded in threat database 1022.

Returning to FIG. 13, in stage 1305 the mapping system receives the threat data from threat database 1022. In stage 1306, mapping system 1050 retrieves identification information from a CDR database, such as at least one of authentication database data 1032 and call database 1033, for those network points at which the threats started (or ended). In one embodiment, at least one part of the threat data (such as the IP address or Caller ID information) may be used as a key to retrieve the associated record(s) in authentication database 1032 and/or call database 1033. As shown by the examples in FIGS. 5 and 16, the retrieved identification data can include authentication identification, network address, e.g., IP address, caller ID information, and/or any other network address information of the network point at which the threat started or ended, as necessary.

At stage 1308, mapping system 1050 retrieves geographical location data, for the computer or device at which the threat(s) started or ended, from location system 1040. In one embodiment, at least one part of the identification data (such as authentication identification or caller ID information) may be used as a key to identify and retrieve the associated record(s) in at least one of customer database 1042 and /or network element database 1043. The location data retrieved may include such information as the physical location (e.g., mailing address or geographic coordinates) for the identified attacked network point or device. FIGS. 6, 11A and 11B show examples of such location data.

At stage 1310, the retrieved data are preferably correlated such that all information for a particular threat is stored in a record or records for that threat. In one embodiment, the correlated data are stored as map data in mapping database 110. FIG. 7 shows an example of records in mapping database 110. As shown, mapping database records may contain the threat information, the network address (such as the IP address or telephone number), and the physical location such as the mailing address or coordinate information. In addition, mapping database records may also include a status of the threat and an indication of the response person or team assigned to respond to the threat.

Figure 8:
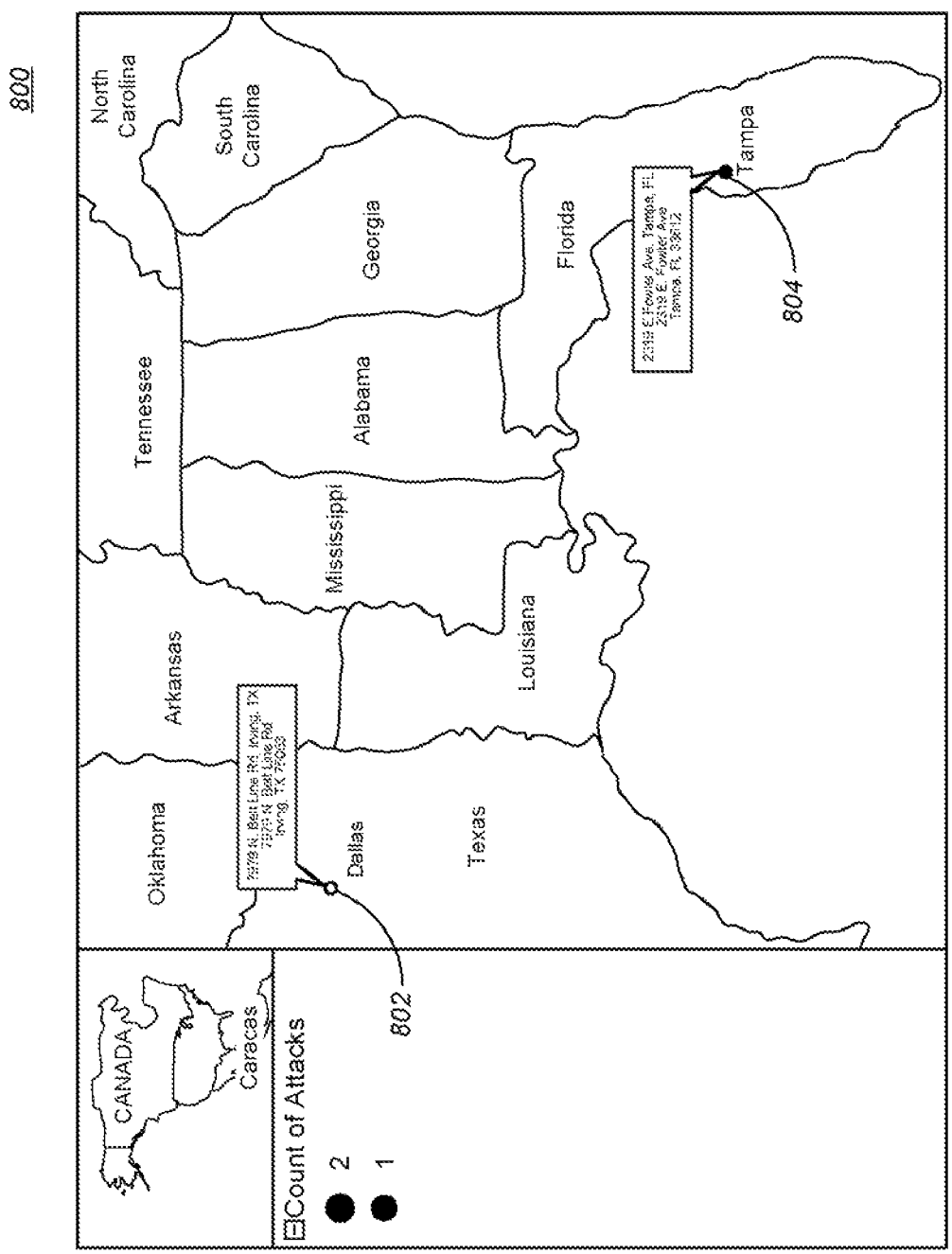
FIG. 8 is an exemplary screenshot of a map geographically mapping vulnerabilities consistent with the present invention.
Figure 12:
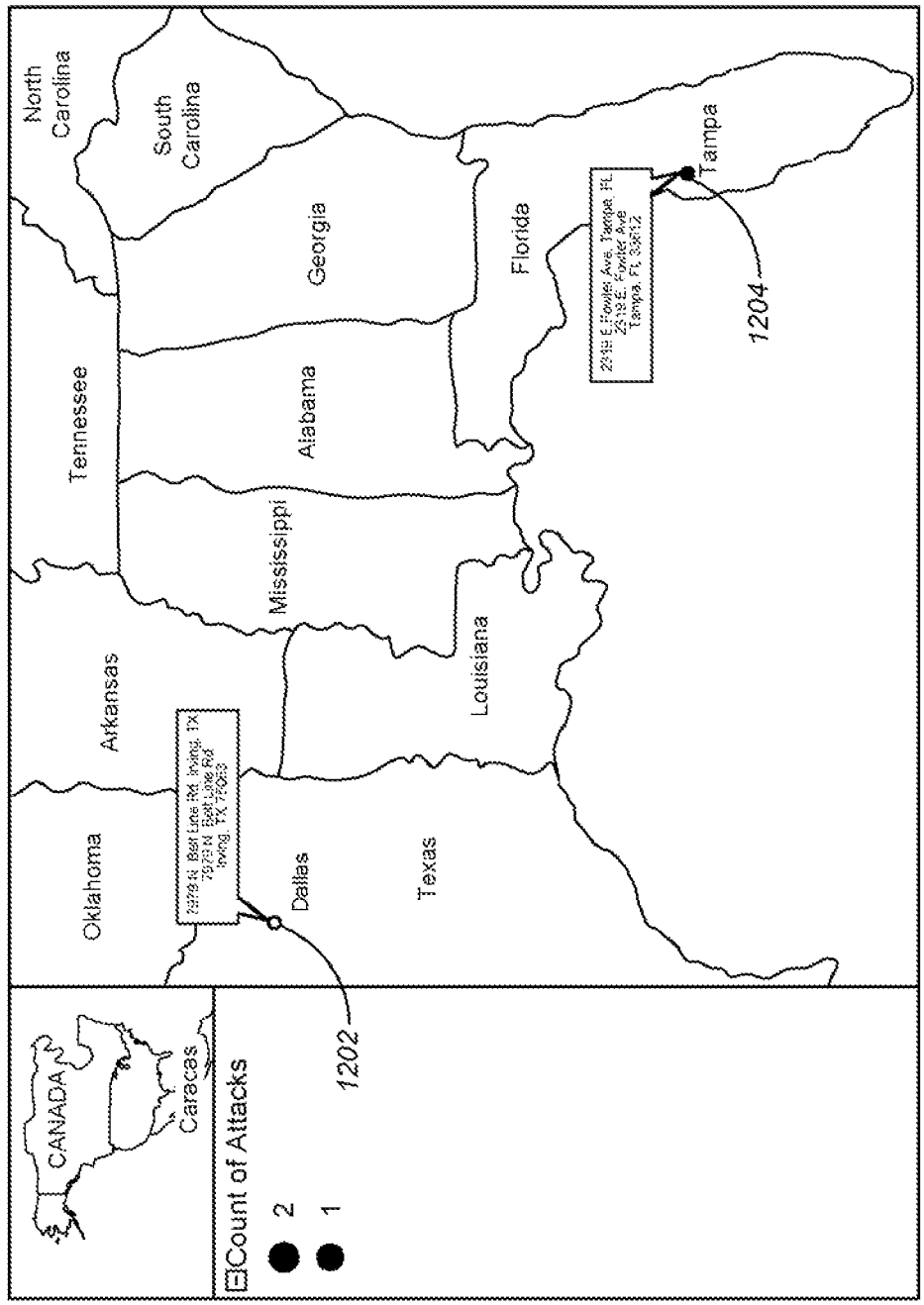
FIG. 12 is a second exemplary screenshot of a map geographically mapping vulnerabilities.

Returning to FIG. 13, at stage 1312, mapping system 1050 maps the location of the threat. In one embodiment, the map data for each threat are imported into a commercially available mapping program such as Microsoft MapPoint™ to visually locate the threat points on a map presented on display 114. In one embodiment, the map may represent each of the threats as a symbol on the map, for example, as a "pushpin." An exemplary map 800 using this pushpin approach is shown in FIG. 8. Within map 800, each pushpin symbol 802, 804, shows the location of a point of threat requiring a response. The color of the pushpin symbol or representation on the map may be used to identify the quantity of threats in an area on the map, allowing the administrators to easily identify problem areas. In addition, the symbol (i.e., pushpin or other symbol) may be linked to the underlying data. For example, FIG. 12 illustrates a map 1200, which includes description windows associated with each pushpin location 1202, 1204 (e.g., specifying the address associated with each pushpin). In some embodiments, a system user may, using an input device, select a symbol on the map to initiate a display of data such as the threat type, network address, status of the response, or other information.

Figure 14A:
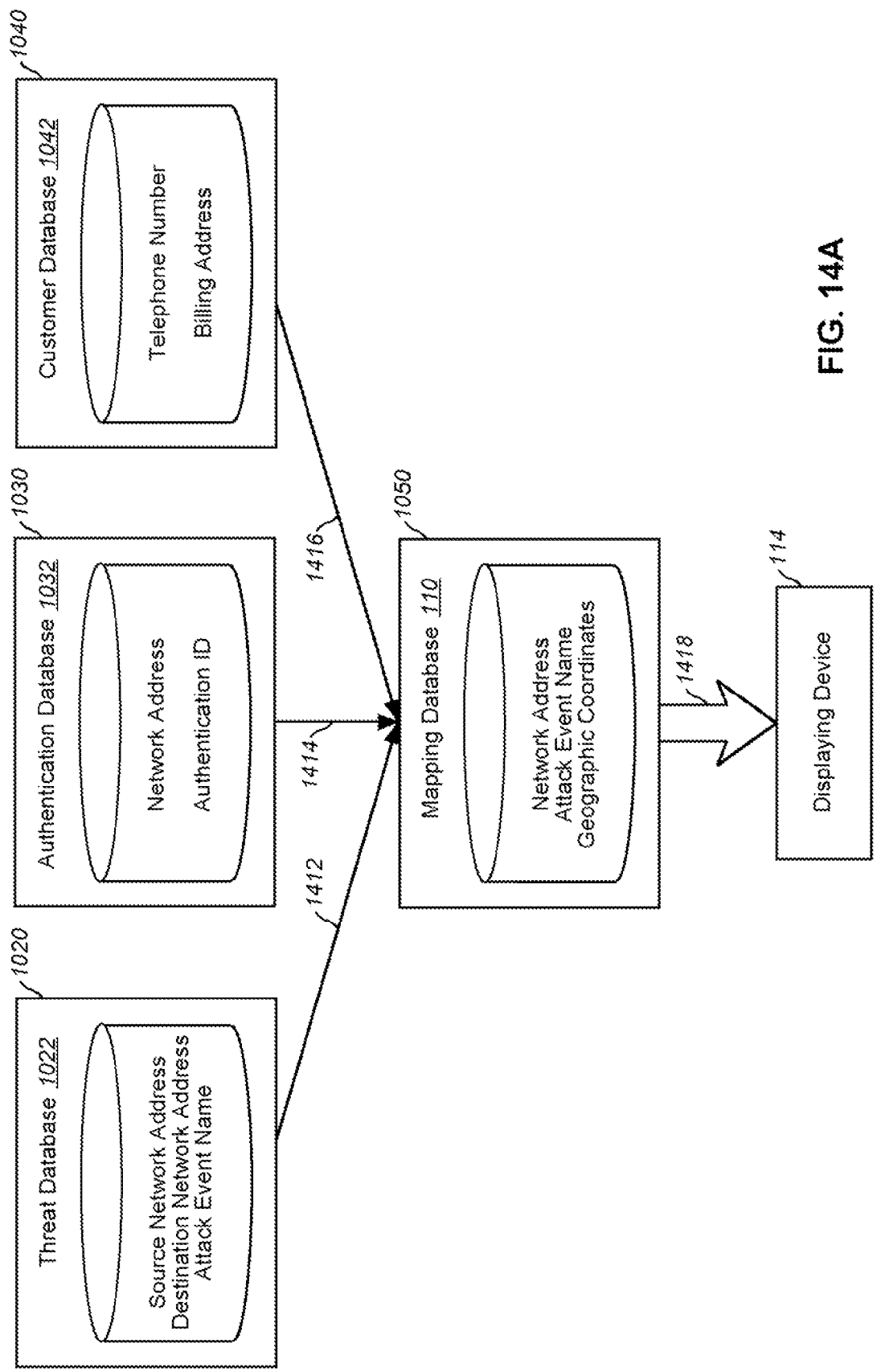
FIG. 14A is a block diagram of an exemplary method for geographically correlating and mapping threats wherein the mapping system communicates directly with the identification system.
Figure 14B:
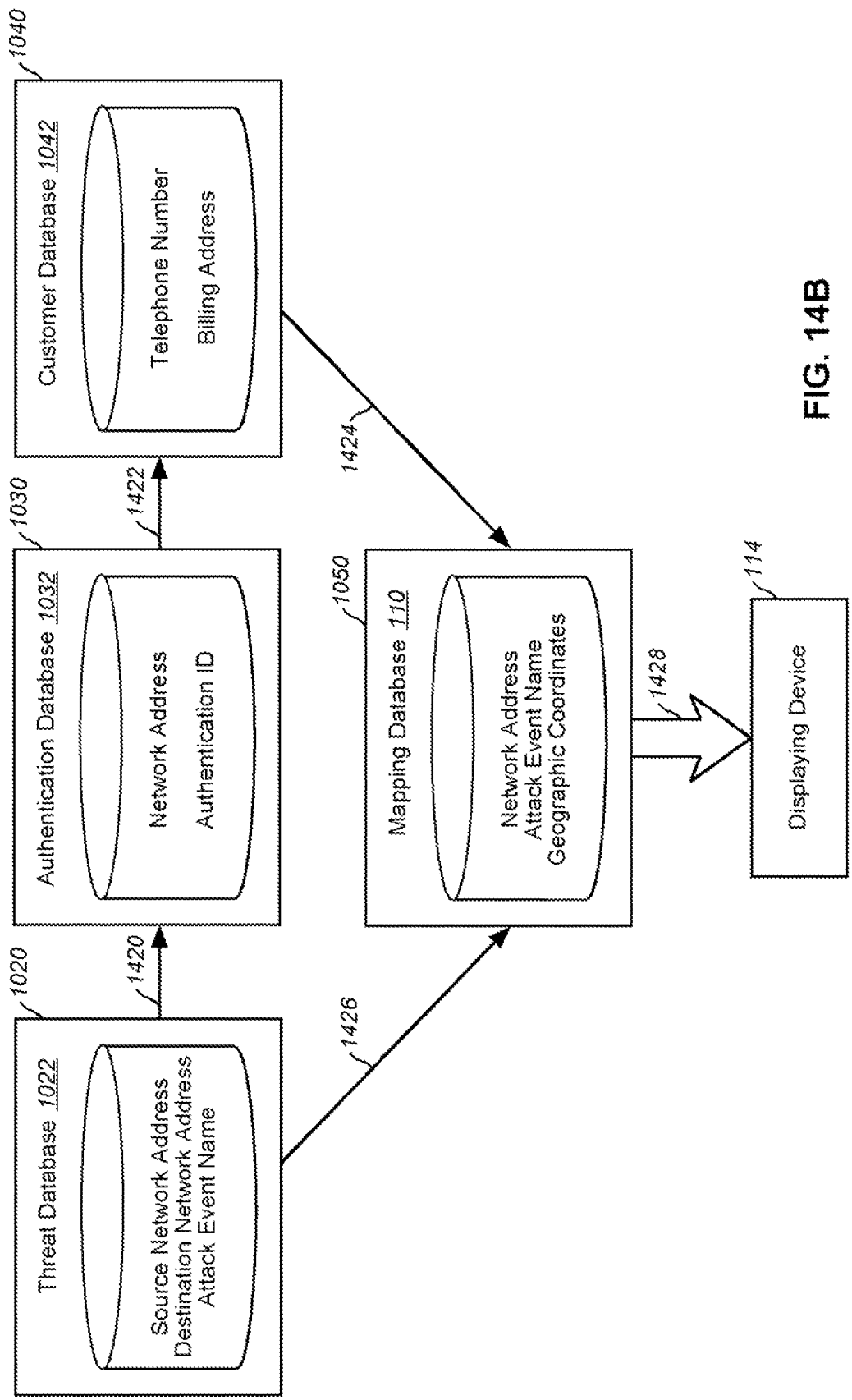
FIG. 14B is a block diagram of an exemplary method for geographically correlating and mapping threats wherein the mapping system does not communicate directly with the identification system.

FIGS. 14A and 14B are block diagrams showing two exemplary methods for geographically mapping threats through correlation. In FIG. 14A, mapping system 1050 receives, from threat database 1022 in TDS 1020, threat data containing, for example, one or more of a source network address such as a source IP address or a source telephone number, destination network address such as a destination IP address or a destination telephone number, and attack event name, at stage 1412. In addition, at stage 1414, mapping system 1050 receives identification data from a CDR database, such as the authentication database 1032 of identification system 1030. The identification data may contain, for example, an IP address and authentication identification. At stage 1416, mapping system 1050 receives location data from a customer database 1042 in location system 1040. Location data may contain, for example, a telephone number and billing information such as mailing addresses. These stages, namely, 1412, 1414 and 1416, may take place in other sequences than described here.

After receiving threat, identification, and location data, mapping system 1050 correlates threat data and identification data with location data to generate map data. In one embodiment, mapping system 1050 joins tables from the aforementioned databases, utilizes network address as a key to identify the record(s) indicating the source or destination of the threat and the identity of the network point experiencing the threat, uses the identification data to locate associated geographic coordinates, and generates map data containing network address, attack event name, and geographic coordinates for storage in mapping database 110. This correlation may be implemented in many other ways. At stage 1418, mapping system 1050 generates a map displaying a geographical location of the threat(s) based on the map data from mapping database 110.

In another embodiment, FIG. 14B shows an exemplary method where the mapping system does not communicate directly with the identification system. In FIG. 14B, identification system 1030 receives, from TDS 1020, threat data describing or identifying the threat(s), at stage 1420. Also at stage 1420, identification system 1030 queries the table(s) in the authentication database 1032, utilizing either source network address or destination network address of the threat(s) in threat database 1022 as a key to identify the record(s) containing identification information associated with the network address. At stage 1422, location system 1040 receives identification data from identification system 1030, and uses this data to identify the record(s) containing location data associated with the identification data from the customer database 1042.

Mapping system 1050 receives location data from location system 1040 at stage 1424 and threat data identifying the source or destination of the threat(s) from threat database 1022 at stage 1426. Mapping system 1050 correlates the threat data with location data and generates map data containing network address, attack event name, and geographic coordinates for storage in mapping database 110. In one embodiment, after stage 1422, location data contain an identifier such as network address and the correlation is implemented by matching the identifiers between location data and threat data. However, one of ordinary skill in the art will recognize that this correlation may be implemented in many ways. At stage 1428, mapping system 1050 generates a map displaying a geographical location of the threat(s) based on the map data from mapping database 110.

The map data in mapping database 110 may be periodically updated, as described above with respect to FIG. 9.

Figure 17:
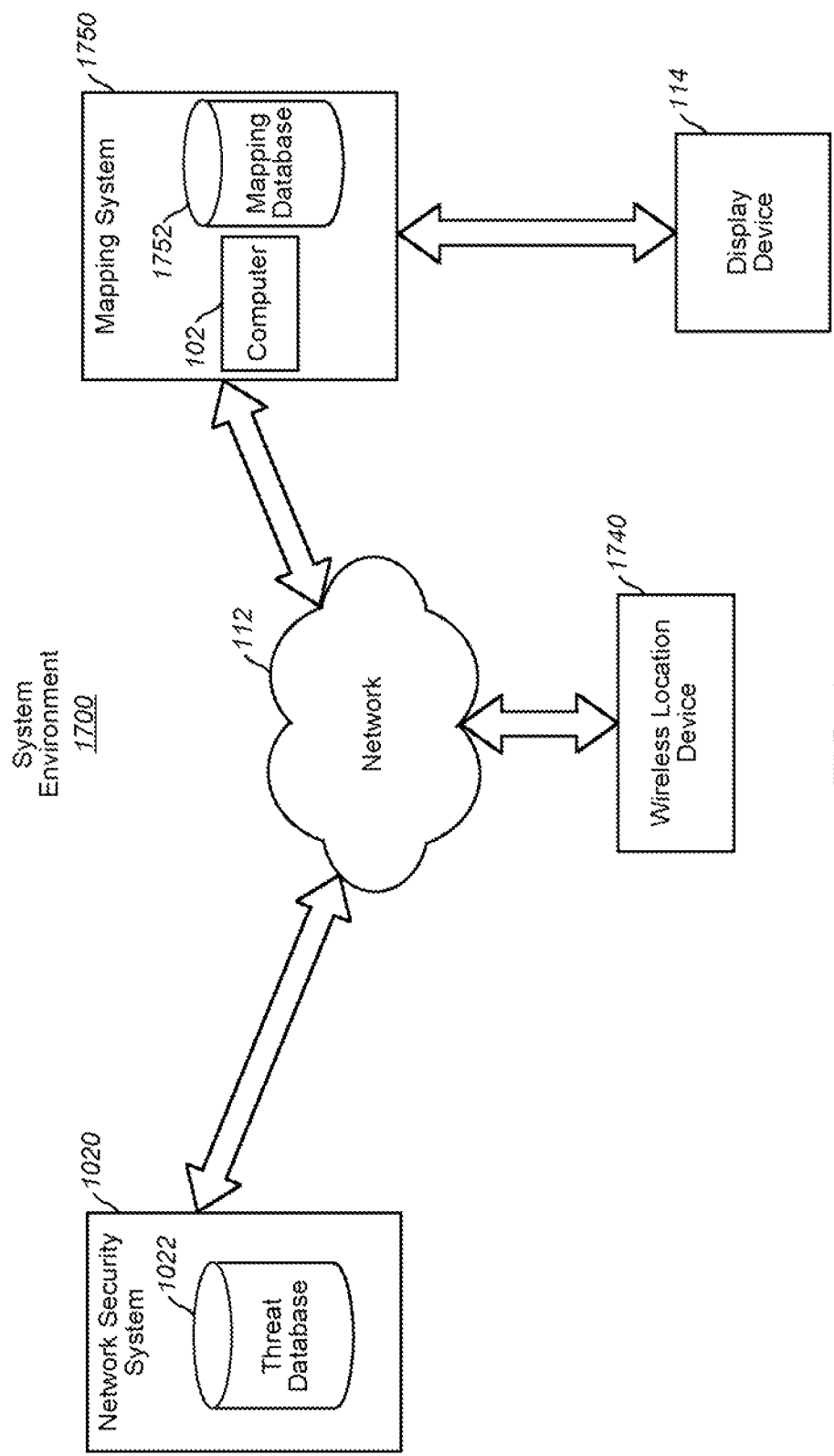
FIG. 17 is a block diagram of a third exemplary environment in which systems and methods consistent with the present invention may be implemented.

FIG. 17 is a block diagram of a third exemplary environment 1700 in which preferred systems and methods consistent with the present invention may be implemented. The number of components in environment 1700 is not limited to what is shown and other variations in the number of arrangements of components are possible. The components of FIG. 17 may be implemented through hardware, software, and/or firmware.

As shown in FIG. 17, environment 1700 may include a TDS 1020 and a mapping system 1750 similar those depicted in FIG. 10 and described above, with modifications as noted below. Also similarly to the environment 100 of FIG. 1, environment 1700 also includes a display device 114, such as a video display, for displaying the geographical threat information correlated and mapped by the mapping system 1750 using the methods discussed herein. Identification system 1030 and location system 1040 of FIG. 10, although not shown in FIG. 17, may be included in system environment 1700 in a manner similar to described above. Communication between systems in environment 1700 may be conducted through a network 112 as described above.

In addition, environment 1700 may include a mobile device 1740, such as a GPS device, from which the network security system 1020 and/or mapping system 1750 receives wireless location data, such as GPS data in a format such as NMEA 0183 via software transmitting this data using protocols such as TCP or UDP. Mobile device 1740 may communicate with network security system 1020 and/or mapping system 1750 via one or more well known data transmission capabilities or software. While the mobile device may be embodied as a GPS-enabled device as noted above, other types of mobile devices may be employed that identify its location based upon signals transmitted by the mobile device through a wireless network. For example, the location of other types of mobile devices may be provided in relation to one or more cell towers or base stations.

Figure 18:
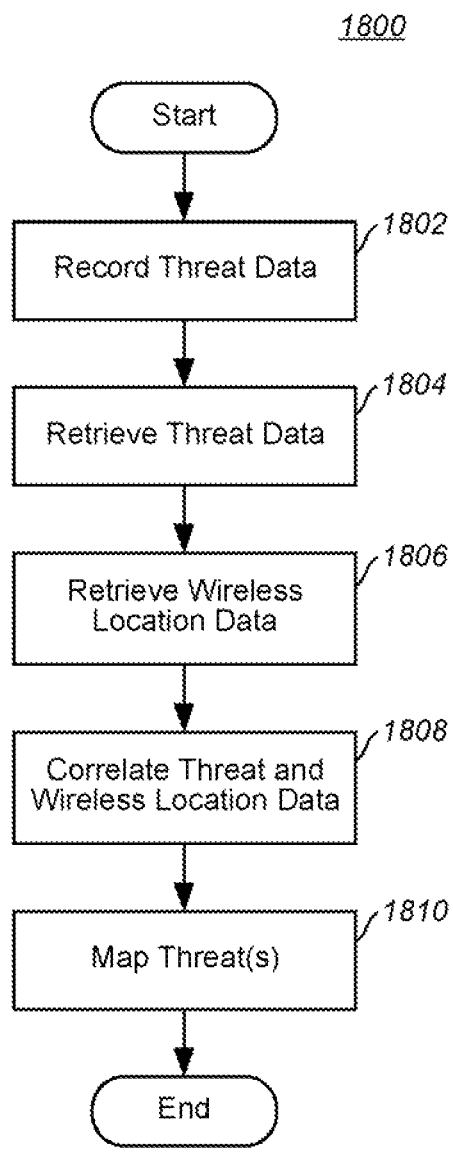
FIG. 18 is a flowchart of an exemplary method for locating a source of a computer-originated attack based on wireless location data provided by a mobile computing device.

FIG. 18 shows a preferred method 1800 which may be performed by mapping system 1750 to locate sources of computer-originated attacks on mobile devices. Method 1800 begins by recording threat data at stage 1802. Similar to step 302 of method 300, threat data may be any information describing or identifying a threat. In one embodiment, the threat data may include an identification (such as the IP address or telephone number) of the mobile device or network point where the computer-originated attack started, and the name and description of the attack event, among other information. The threat data are stored in threat database 1022. As noted above, FIG. 5 shows one embodiment of threat data within threat database 1022.

Returning to FIG. 18, at stage 1804, the threat data stored in TDS 1020 is retrieved. At stage 1806, mapping system 1750 retrieves wireless location data for mobile devices 1740 at which the computer-originated attack(s) started. In one embodiment in which the mobile device is GPS enabled, at least one part of the threat data (such as the IP address or telephone number) may be used as a key to retrieve the appropriate wireless location record(s), such as from a CDR database in instances in which the threat data includes an IP address or a customer database in instances in which the threat data includes a telephone number. In one embodiment, the wireless location data may include IP address and location information, such as geographic coordinates, of the mobile device 1740 at which the computer-originated attack(s) started, as necessary. FIG. 20 shows one exemplary embodiment of wireless location data 2000, which may be provided by GPS-enabled device 1740.

Once the relevant data have been retrieved from threat database 1022 and mobile device 1740, they may be stored in mapping system 1750 (e.g., in mapping database 1752). At stage 1808, the retrieved threat data and wireless location data are preferably correlated such that all information for a particular computer-originated attack is stored in a record or records for that attack. In one embodiment, the correlated data are stored as map data in mapping database 1752. FIG. 21 shows an exemplary embodiment of records 2100 in mapping database 1752. As shown, mapping database records 2100 may contain attack event name, the network address (such as the IP address or telephone number from threat database 1022), and the physical location such as geographic coordinates (from the wireless location data provided by the mobile device 1740) or the billing address (from a customer database). In addition, mapping database records may also include a status of the threat and an indication of the response person or team assigned to respond to the threat.

Returning to FIG. 18, at stage 1810, mapping system 1750 maps the location of the source of the computer-originated attack. In one embodiment, the map data for each computer-originated attack are imported into a commercially available mapping program such as Microsoft MapPoint™ to visually locate the threat points on a map presented on display 114. As noted above, the map may represent each of the threats as a symbol on the map, for example, as a "pushpin," such as illustrated in FIG. 8, where each pushpin symbol 802, 804, shows the location of a point of threat. As in the previously described embodiments, the mapping provided herein may allow response teams to identify "pockets" of threats and will be able to better prioritize and more efficiently schedule response personnel to respond and mitigate or eliminate the threats, based on geographical location. The map may be updated when threat information becomes updates, as noted above. In addition, due the mobile nature of GPS devices, the map may be updated at regular intervals using currently available GPS data from GPS devices 1740.

Figure 19A:
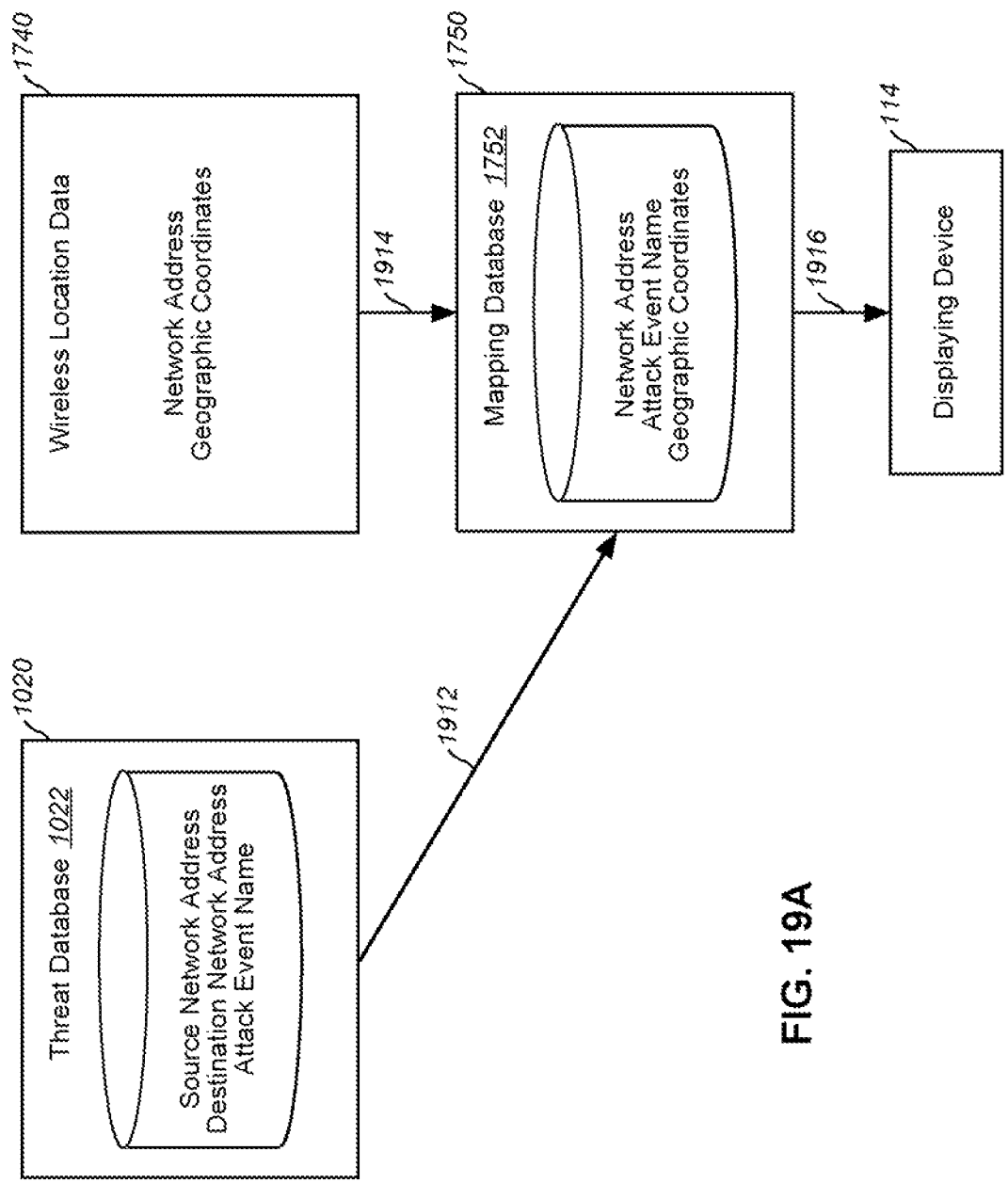
FIG. 19A is a block diagram of an exemplary method for locating a source of a computer-originated attack based on wireless location data provided by a mobile computing device wherein the network-based system does not communicate directly with the mobile device.
Figure 19B:
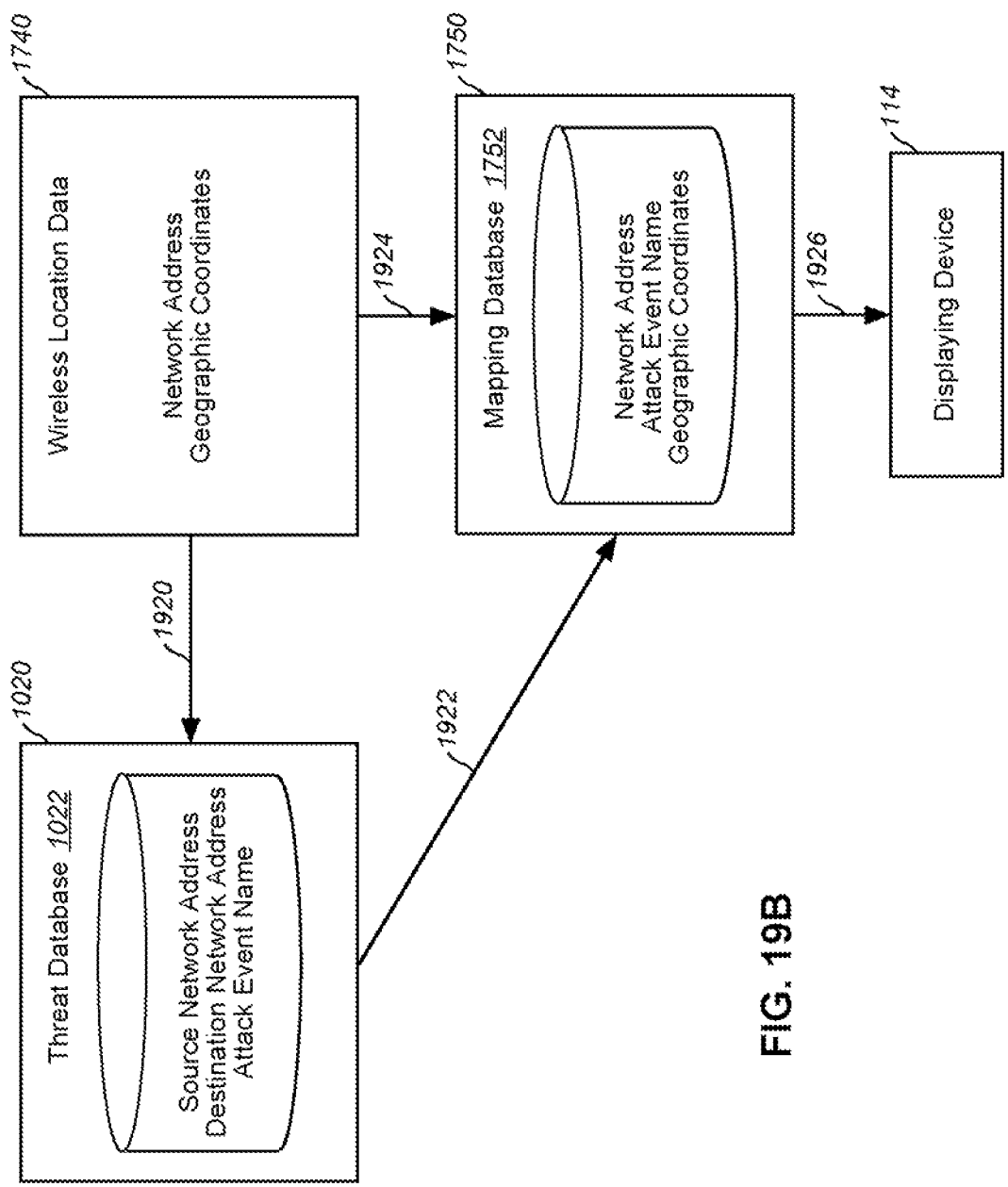
FIG. 19B is a block diagram of an exemplary method for locating a source of a computer-originated attack based on wireless location data provided by a mobile computing device wherein the network-based system communicates directly with the mobile device.

FIGS. 19A and 19B are block diagrams showing two exemplary methods for locating a source of a computer-originated attack based on a GPS device. In the method depicted in FIG. 19A, in a stage 1912, mapping system 1750 receives, from threat database 1022 in TDS 1020, threat data containing, for example, source network address such as source IP address or source telephone number, destination network address such as destination IP address or destination telephone number, and attack event name. In addition, at stage 1914, mapping system 1750 receives wireless location data from mobile device 1740. Wireless location data contains, for example, IP address and geographic coordinates of the impacted mobile device or a cell tower or base station serving the mobile device. These stages 1912 and 1914 may take place simultaneously or in any sequence.

After receiving threat and wireless location data, mapping system 1750 correlates threat data with wireless location data to generate map data, as noted above. In one embodiment, mapping system 1750 joins tables from threat database 1022 with wireless location data, utilizes the network address in the wireless location data as a key to identify the record(s) indicating the source of the threat or computer-originated attack from threat database 1022, and generates map data containing network address, attack event name, and geographic coordinates in mapping database 1752. At stage 1916, mapping system 1750 generates a map displaying a geographical location of the source of the threat(s) based on the map data from mapping database 1752.

In the exemplary method depicted in FIG. 19B, the TDS communicates directly with the mobile device. As shown, TDS 1020 receives wireless location data describing or identifying the impacted mobile device from the mobile device 1740 at stage 1920. Also at stage 1920, TDS 1020 queries the table(s) in threat database 1022, utilizing the network address associated with the wireless data as a key to identify the record(s) describing or identifying the threat(s) from threat database 1022.

At stage 1922, mapping system 1750 receives threat data describing or identifying the threat(s) from threat database 1022. At stage 1924, mapping system 1750 receives wireless location data from mobile device 1740. Mapping system 1750 further correlates threat data with wireless location data and generates map data containing network address, attack event name, and geographic coordinates in mapping database 1752. In one embodiment, the correlation is implemented by matching the network addresses between wireless location data and threat data, although other correlation methods are possible. At stage 1926, mapping system 1750 generates a map displaying geographical location of the source of the threat(s) or vulnerabilit(ies) based on the map data from mapping database 1752.

The source of a wireless (data) call may also be located based upon wireless location data. In this regard, mapping system 1750 receives, from threat database 1022 in TDS 1020, threat data containing, for example, source network address, destination network address, and attack event name. Information about the source network address of a threat is passed from the threat database 1022 to an authentication module (e.g., RADIUS). The source network address is correlated with authentication information at the authentication module. The authentication information is then passed from the authentication module to a location information module, where the location, e.g., the GPS coordinates, of the source of the wireless call are determined, as such determinations may be made by various systems in wireless communications systems, such as by reference to a CDR database. Mapping system 1750 receives wireless location (e.g., GPS) data from location information module 1932. Wireless location data contains, for example, IP address and geographic (GPS) coordinates of the impacted source device.

After receiving threat and wireless location data, mapping system 1750 correlates threat data with wireless location data to generate map data, as noted above. In one embodiment, mapping system 1750 joins tables from threat database 1022 with wireless location data, utilizes the network address in the wireless location data as a key to identify the record(s) indicating the source of the threat or computer-originated attack from threat database 1022, and generates map data containing network address, attack event name, and geographic coordinates in mapping database 1752. At stage 1926, mapping system 1750 generates a map displaying a geographical location of the source of the threat(s) based on the map data from mapping database 1752.

Figure 22A:
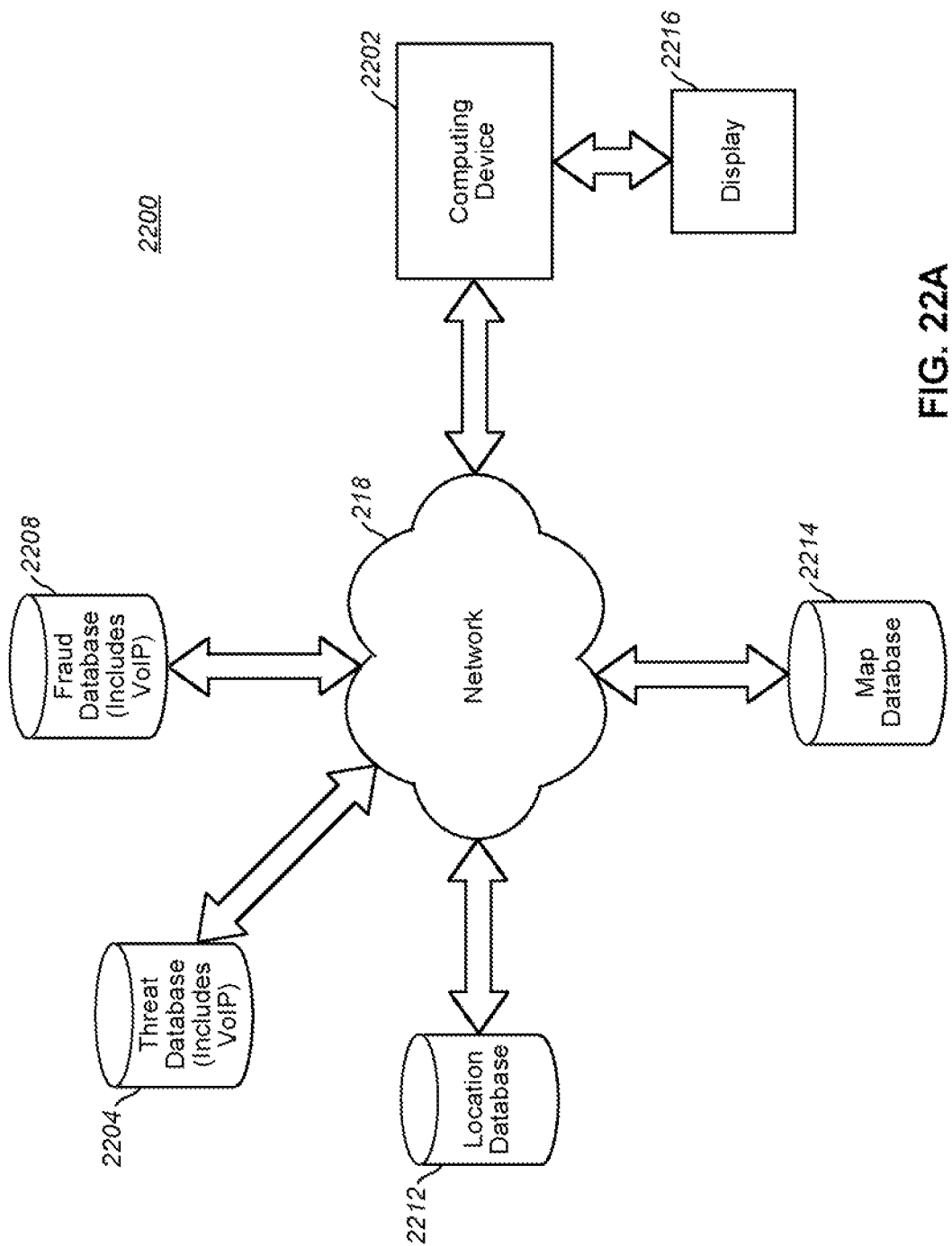
FIG. 22A is a block diagram of one exemplary environment in which the systems and methods of the present invention may be implemented.

FIG. 22A is an alternative block diagram of one exemplary environment in which the systems and methods of the present invention may be implemented. As shown in FIG. 22A, system 2200 employs a computing device 2202 that may be used for mapping. Such a computing device may be one such as is shown and described in relation to FIG. 2, above, though other computing devices capable of performing a mapping function are contemplated within the scope of this invention. In addition, the embodiment of system 2200 may also employ databases such as a threat database 2204, a fraud database 2208, a location database 2212, and a mapping database 2214, each in electronic communication with computing device 2202. System 2200 also includes a display 2216, such as a video display, for displaying the geographic information correlated and mapped by computing device 2202 using the methods discussed herein, and a network 2218, in electronic communication with the computing device 2202. The components that comprise the system 2200 communicate with one another through a network 2218, which may be wired, wireless, optical or combinations thereof. The network 2218 is comprised of physical and virtual devices and connections and includes computer software executing on the processors of one or more computing devices, memory, firmware and the network may support one or more communications protocols such as, for example, TCP/IP.

Figure 22B:
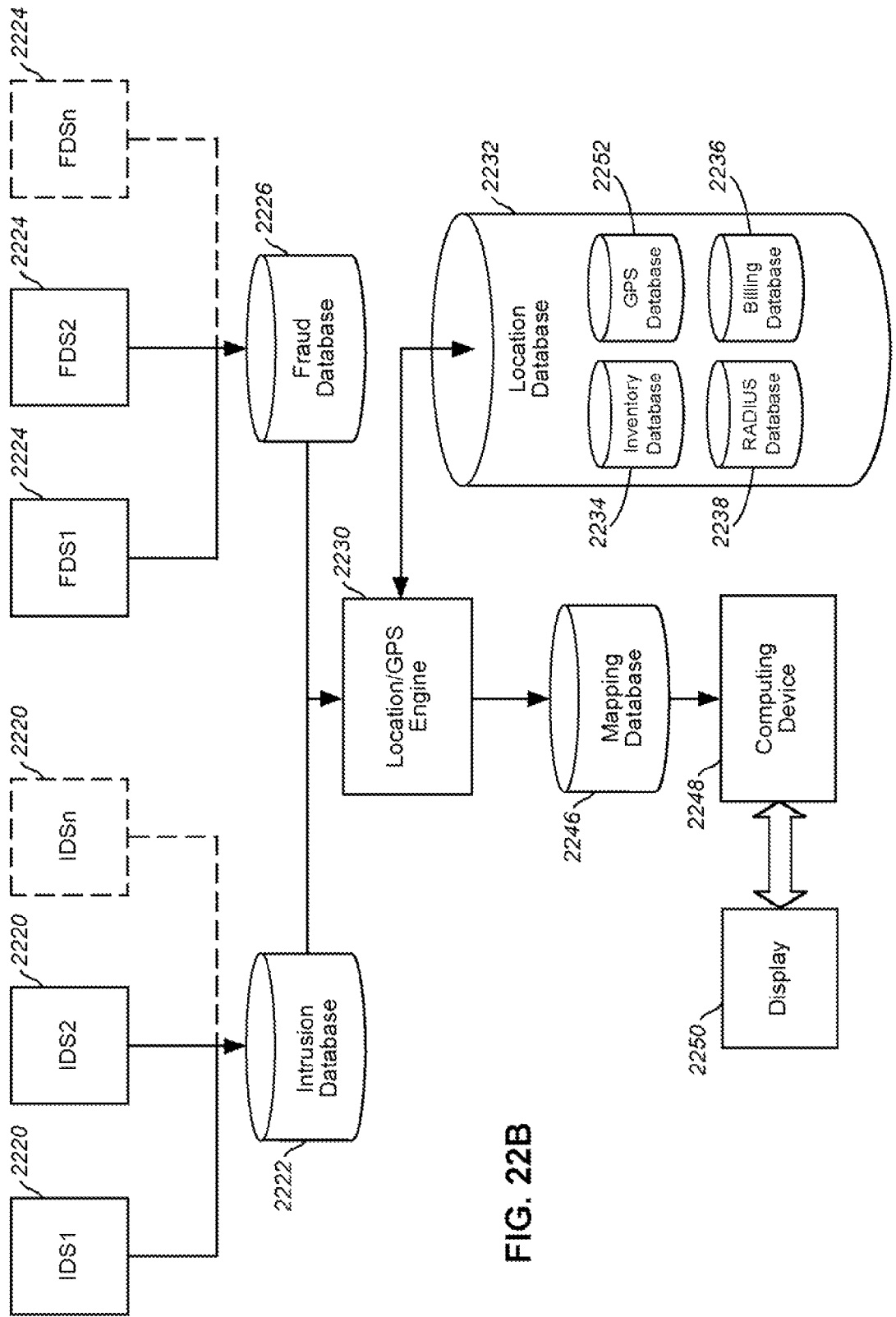
FIG. 22B is an alternative block diagram of one exemplary environment in which the systems and methods of the present invention may be implemented.

Yet another alternative block diagram of one exemplary environment in which the systems and methods of the present invention may be implemented is shown in FIG. 22B. In FIG. 22B, one or more threat detection systems (TDSs) 2220, such as the one described in U.S. patent application Ser. No. 10/916,873, filed Aug. 12, 2004, entitled "GEOGRAPHICAL INTRUSION RESPONSE PRIORITIZATION MAP- PING SYSTEM," fully incorporated herein by reference and made a part hereof, are used to populate a threat database 2222. Likewise, one or more fraud detection systems (FDSs) 2224, such as the one described in U.S. patent application Ser. No. 11/319,608, "MULTIDIMENSIONAL TRANSACTION FRAUD DETECTION SYSTEM AND METHOD," having as an inventor James T. McConnell and filed on Dec. 29, 2005, fully incorporated herein by reference and made a part hereof, are used to populate a fraud database 2226. Information from each of these databases 2222, 2226 is provided to a location/GPS engine 2230 operating on one or more processors on one or more computing devices. Information provided to the location/GPS engine 2230 may include, for example, data related to the nature of the threat and information from which a location may be determined such as, for example, an IP address, a telephone number, a street address, etc. The location/GPS engine 2230 receives the provided database information and, if a more accurate location is needed or if the provided address is to be verified or correlated with other location information, the location/GPS engine 2230 accesses a location database 2232. The location database 2232 may be comprised of a number of separate databases or it may be an amalgamation of information from various sources and databases into one database. In one exemplary embodiment, the location database 2232 may be comprised of an inventory database 2234 that includes information about telecommunications and network equipment and the location of such equipment; a billing database 2236 that includes information about billing addresses for telecommunications, ISP, CATV or other system, network or services subscribers; a RADIUS database 2238, which is further described herein; and a GPS database 2252, which provides GPS location information (e.g., coordinates) of devices containing GPS receivers that access a network or the location of devices that access one or more GPS-enabled devices. It is to be appreciated that this is just one embodiment of a location database and it is contemplated under the scope of this invention that location databases comprised of different, more, fewer and different combinations of databases or sources of location information are contemplated.

From the location database 2232, the location/GPS engine 2230 determines a physical location or coordinates (e.g., GPS-latitude and longitude, horizontal and vertical, etc.) for the threat information received from one or both of the threat database 2222 and the fraud database 2226 or any other threat database. The data related to the nature of the threat and its associated location or coordinate information is then provided to a mapping database 2246, where it is stored and may be accessed by a mapping computer product operating computing device 2248 and graphically displayed on a display 2250.

Figure 23A:
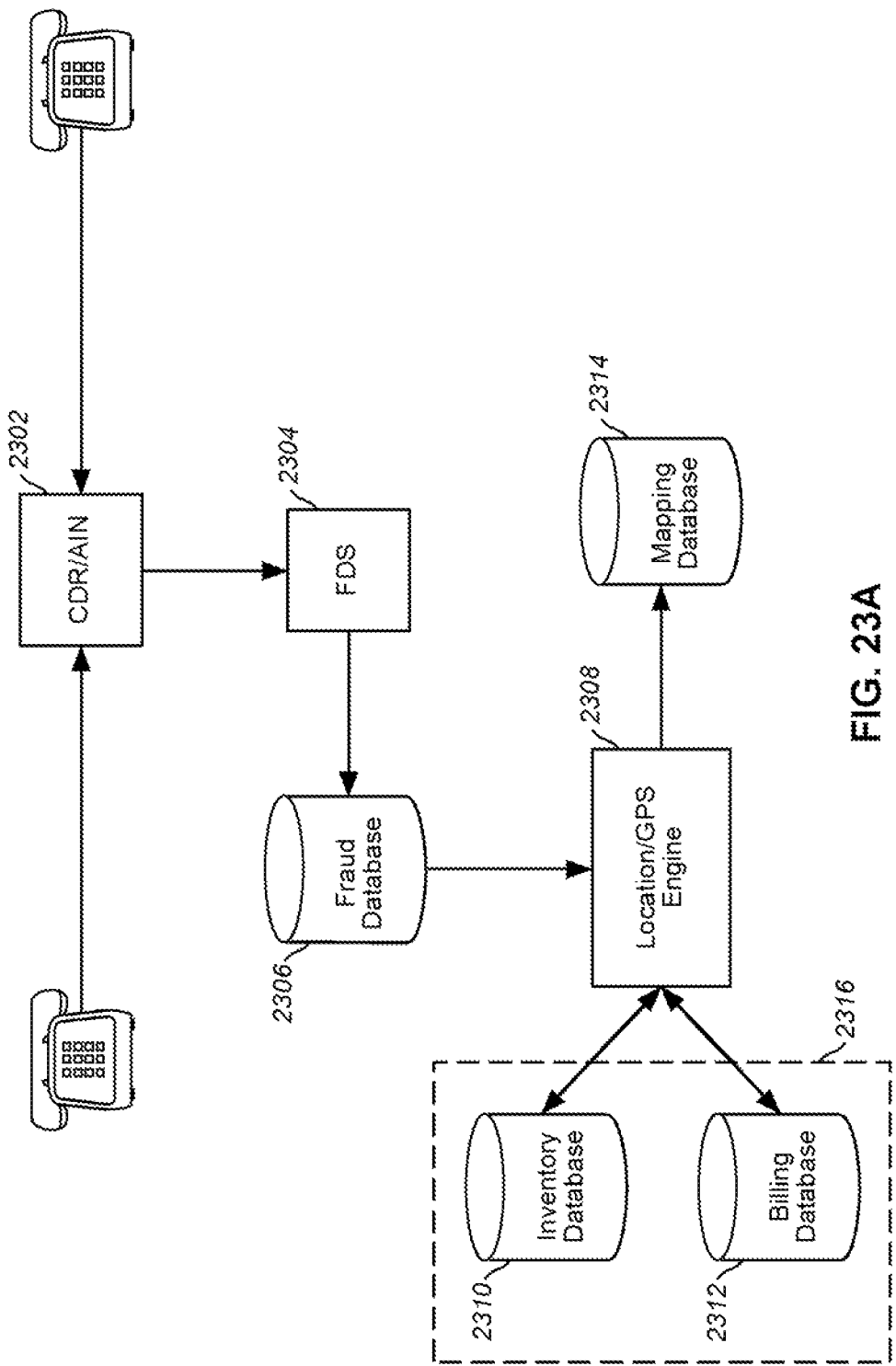
FIG. 23A is a block diagram of one exemplary environment in which the systems and methods of fraud detection in a telecommunications system may be implemented.

As previously described, U.S. patent application Ser. No. 11/319,608 describes one method of determining fraud in transactions. Another method of detecting fraud in telecommunications transactions and activities is through the monitoring of call detail records (CDRs) or advanced intelligent network (AIN) information. FIG. 23A is block diagram of one exemplary environment in which the systems and methods of fraud detection in a telecommunications system may be implemented. As shown in FIG. 23A, the CDR/AIN 2302 is comprised of computer records containing data unique to a specific call. The information is processed as a unit and may contain details such as, for example, an originating switch, an originating telephone number, a terminating switch, a terminating telephone number, call length, time of day, etc. CDRs and AIN records are known in the art and one or both are used by most telecommunications providers. Telecommunications providers employ FDSs 2304 to monitor and analyze the CDR/AIN 2302 for activities and patterns of activities or characteristics that are indicative of fraudulent activities based on known fraudulent behavior and the business rules of the organization. Generally, FDSs 2304 are computer algorithms implemented on computing device as large amounts of data is reviewed. FDSs 2304 are generally known in the art by those of ordinary skill. In other instances the review of the CDR/AIN 2302 may be performed manually.

Based on the application of the FDS 2304 to the CDR/AIN 2302, or manual review of the CDR/AIN 2302, a fraud detection log is created and stored in a fraud database 2306. The fraud database 2306 includes at least some information about the suspected fraudulent activity or complaint (or a code that corresponds to a description of the suspected fraudulent activity in a table), and one or more telephone numbers suspected of involvement in the potentially fraudulent activity. An exemplary database record for a fraud database 2306 is shown in FIG. 23B showing a complaint description 2320 and a telephone number 2322 associated with that complaint. It also includes an identifier 2324 that indicates whether the telephone number 2322 is an originating telephone number or a terminating telephone number. It is to be appreciated that the telephone number 2322 shown in FIG. 23B may be either the originating number or the terminating number from the CDR/AIN 2302 as indicated by the identifier 2324.

Referring back to FIG. 23A, a location/GPS engine 2308 extracts information from the fraud database including at least the telephone number 2322. Generally, telephone numbers are in the format of "NPA-NXX-XXXX," though other formats may be used in various countries and are contemplated within the scope of this invention. Once the telephone number 2322 is extracted from the fraud database 2306, the location/GPS engine 2308 parses the telephone number 2322 into its NPA and NXX components. The "NPA" is the first three digits in the 10-digit telephone number addressing scheme and is commonly known as the area code. The "NXX" is the second three digits in the 10-digit telephone number addressing scheme and is also known as the prefix of the central office (CO) code. For instance, in the first telephone number 2322 of FIG. 23B, the NPA is "123" and the NXX is "456."

An inventory of equipment, devices, and systems and their locations or coverage areas is kept by telecommunications providers or NPA NXX databases are commercially available such as the North American Local Exchange NPA NXX Database™ available from Quentin Sager Consulting (www.quenticsagerconsulting.com) of Altoona, Fla. or The Local Exchange Routing Guide, commonly known as "The LERG", which is a database of NPA/NXX published every month by Telcordia Technologies, Inc. of Piscataway, N.J. In FIG. 23A, this is shown as an inventory database 2310 that, as with all databases discussed herein, may be comprised of more than one physical database or sources of information. The location/GPS engine 2308, after extracting the NPA and NXX from the suspect telephone number 2322, will search the inventory database 2310 first using the NPA. Once the NPA is found, then the location of a suspect telephone number 2322 is narrowed to the physical area within a particular NPA (area code). Once the NPA is found, the location/GPS engine 2308 searches all telephone numbers within that NPA for the corresponding NXX that was extracted from the suspect telephone number 2322. Once the corresponding NXX is found, the search has now narrowed the suspect telephone number 2322 to the NPA (which can be correlated with a state or states), and from the NXX the CO that serves the suspect telephone number 2322 may be determined.

The inventory database 2310 also identifies equipment inventory by a code called a "CLLI" (common language location identification). CLLI provides carriers with a uniform system to identify their equipment, and locate other switching equipment, in a public switched telephone network. The 11-character code identifies place, state, building, and switch function. Generally, digits five and six identify the state and digits 7 and 8 identify the CO. Digits 9-11 of the CLLI identify the switching equipment. The CLLI is also associated with a physical location. That location may be identified by a coordinate system (e.g., GPS, vertical and horizontal coordinates, etc.), or a physical address or by any other means of physically locating the equipment.

FIG. 23C shows sample records from an exemplary inventory database 2310 that may be used in an embodiment according to the present invention. Using the database of FIG. 23C, for example, a suspect telephone number 2322 may be matched with a physical address 2326 associated with a telephone addressing scheme having the NPA 2328, NXX 2330 and last four digits 2332 of the suspect telephone number 2322. It is to be appreciated that the inventory database 2310 contains an actual physical address or location and not a mailing or P.O. Box type address. Furthermore, it is to be appreciated that in some instances the FDS 2304 may not be able to provide a complete suspect telephone number 2322, in which case the location of the fraud may only be narrowed to the CLLI location 2334, 2336, or the area encompassed by the NPA 2328 by the location/GPS engine 2308.

Similar to the searching of the inventory database 2310 by the location/GPS engine 2308 for a physical address associated with a suspect telephone number 2322, a billing database 2312 may also be searched and correlated with the information obtained from the inventory database 2310. FIG. 23D illustrates sample records from an exemplary billing database 2312 that may be used in an embodiment according to the present invention. Such a database as that shown in FIG. 23D is comprised of the telephone number 2338 and the mailing address 2340 of the location where the bill for that telephone number 2338 is sent. Such databases are maintained by telecommunications providers and may be available as "phonebook" databases that may be downloaded from the Internet or purchased from telecommunications providers or publishers of telephone books. It is to be appreciated that telephone book information may not be as complete as information controlled by a telecommunications provider because of the ability to have non-published numbers. It is also to be appreciated that the billing address 2340 is not necessarily the same as the premise location 2326 as described in relation to FIG. 23C, above. For instance, the bill may be sent to a P.O. Box rather than a street address. Also, a corporation with many different physical sites may have their bills for services such as telephone sent to a centralized accounting department. The suspect telephone number 2322 from the fraud database is searched against the telephone numbers 2338 in the billing database 2312 in an attempt to find a billing address 2340 for that number 2322. In one embodiment, once a matching address is found, an algorithm is executed by the location/GPS engine 2308 to obtain coordinates (e.g., GPS, vertical and horizontal coordinates, etc.) for the billing address, if possible, and as such algorithms are known in the art.

The location/GPS engine 2308 then uses the cumulative information derived from the fraud database 2306, the inventory database 2310, and the billing database 2312 to form a mapping database 2314. Collectively, the inventory database 2310 and the billing database 2312 may be considered as a location database 2316 because their function in the exemplary system of FIG. 23A is to provide location information.

An exemplary mapping database structure and exemplary records contained therein are shown in FIG. 23E, which may be used in an embodiment according to the present invention. The mapping database 2314 of FIG. 23E is comprised of complaint information 2342, address information 2344, an identifier 2346 that indicates whether the address is associated with the origination or termination of a suspected fraud activity, a database record identifier 348, and an associated database record identifier 2350. The associated database record identifier 2350 in coordination with the origination/termination identifier 2346 allows the graphical representation between the origination location of complaint/fraud activities and the termination of such activities. It is to be appreciated that the address information 2344 is the best physical address of the fraud location as determined by the location/GPS engine 2308 from the inventory database 2310 and the billing database 2312. For instance, in order of priority, the physical address 2326 from inventory database 2310 is more accurate than a billing address 2340 from the billing database 2312, which is more accurate than the CLLI (location) 2334, 2336, which is more accurate than the NXX range location, which is more accurate than the NPA range location, which is more accurate than simple guessing. Although the address information 2344 of FIG. 23E is generally shown as street-type addresses, it is to be appreciated that in various embodiments the address information 2344 may be in the form of coordinates such as GPS coordinates (latitude and longitude), horizontal and vertical coordinates, etc. It is also to be appreciated that the complaint information 2342 may be in the form of a code or standardized terms in various embodiments according to the present invention such that mapping icons, codes or color schemes may be used to illustrate the severity or character of the complaint or fraud. The mapping database 2314 provides information for mapping the complaint and fraud activities using a mapping computer program operating on a computing device. It is contemplated within the scope of this invention that information contained in the mapping database 2314 may be in various formats and varying order to accommodate the mapping computer program used in an embodiment according to the present invention.

FIG. 24 is an overview flowchart used to explain the steps of an exemplary process for geographic mapping of fraud activities based on information obtained from records related to telephone calls and location information correlation. The process begins at step 2400. At step 2402, call record information is reviewed to look for characteristics and patterns of fraudulent activities as such characteristics may be known. At step 2404, call information of suspected fraud activities is associated with at least one geographical location. At step 2406, the location information obtained at step 2404 is used to graphically designate a geographic point or area on an electronic map by a mapping computer program operating on the processor of a computing device and capable of displaying the geographic information associated with the suspected fraudulent activity. The process ends at step 2408.

FIG. 25 is a flowchart used to explain the steps of an alternate exemplary process for geographic mapping of fraud activities based on CDR and location information correlation. The process begins at step 2500. At step 2502, a CDR is reviewed to look for characteristics and patterns of fraudulent activities as such characteristics may be known. In one embodiment, this review is performed by an algorithm executing on a computing device. At step 2504, a suspected fraudulent activity is identified and at least the originating telephone number associated with the suspected fraudulent activity is extracted from the CDR. In other instances, other telephone numbers associated with the same suspected fraudulent activity may be obtained, such as the terminating number of repetitive nuisance calls or credit card fraud over the telephone. At Step 2506, the one or more telephone numbers obtained in step 2504 are matched against inventory and billing records to find a physical (geographic) location associated with each telephone number. At step 2508, the location information obtained at step 2506 for each telephone number is used to graphically designate a geographic point or area on an electronic map by a mapping computer program operating on the processor of a computing device and capable of displaying the geographic information associated with the suspected fraudulent activity. The process ends at step 2510.

It is to be appreciated that while the embodiments according to the invention have thus far been generally described in relation to a public service telephone network (PSTN) or a plain old telephone system (POTS), they are equally applicable to telecommunications occurring over systems such as voice-over-Internet protocol (VoIP) and wireless systems using, for example, code division multiple access (CDMA) or global system for mobile communications (GSM). Detail records of phone calls are kept for these systems that are analogous to the CDR kept for PSTN systems and likewise can be analyzed and reviewed for suspected fraud activities. In the case of VoIP, IP address location may be found using, for example RADIUS (Remote Authentication Dial In User Service) information, and other means described herein. RADIUS is an authentication, authorization and accounting protocol for applications such as network access or IP mobility that is intended to work in both local and roaming situations. Likewise, call detail records are kept for calls between mobile devices and information in such records may be used to locate the billing address of the owner of the mobile device and, if useful, the location of the cells associated with communication involving the mobile device(s).

Figure 26:
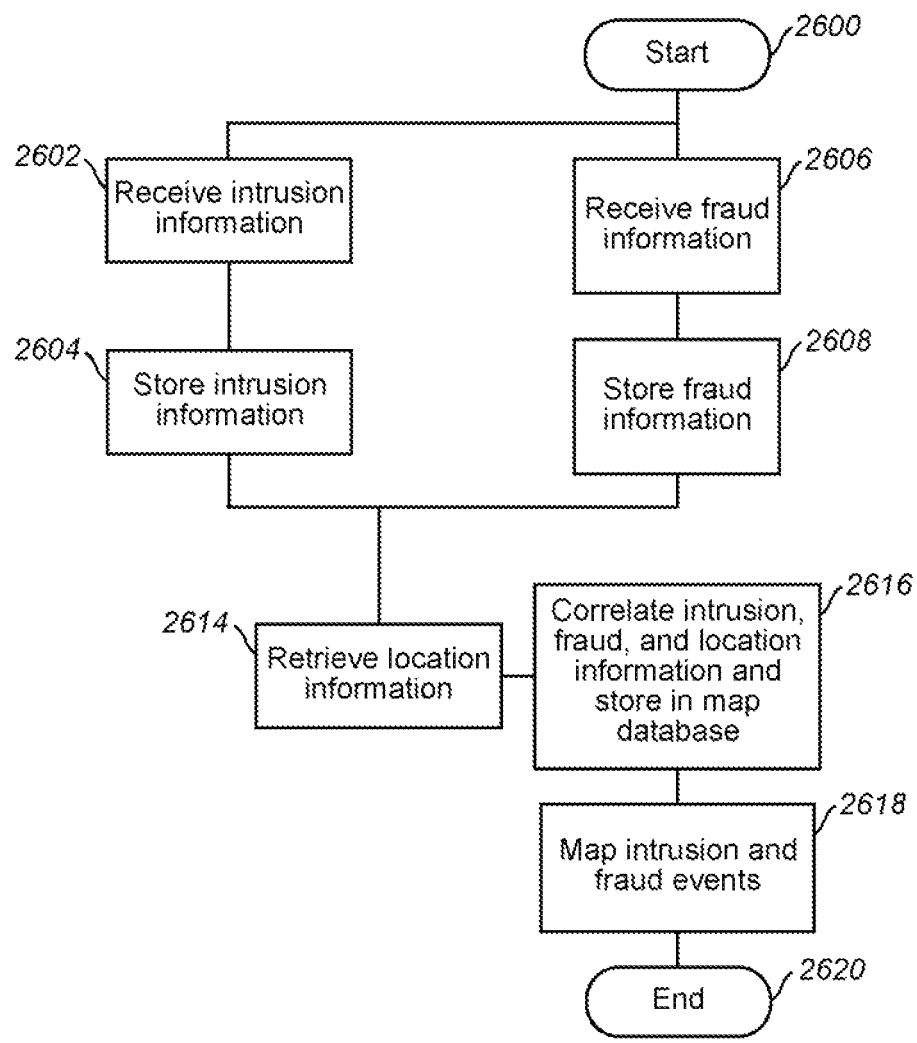
FIG. 26 is an exemplary process for layered geographic mapping of threat information and fraud information consistent with the embodiments according to the present invention.

FIG. 26 shows a process for layered geographic mapping of threats comprised of intrusion information and fraud information consistent with the embodiments according to the present invention. The process begins at step 2600. At step 2602, intrusion information is received such as from a computer administrator, as the output of software designed to detect intrusions, from an intrusion detection system, router, network management system, security information manager, or from any other source. In one embodiment, the intrusion information may include an identification (such as the IP address) of the computer where the intrusion started or ended, the name and description of the intrusion, and possibly other data. At step 2604 and upon receipt of the intrusion information, it is stored in an intrusion database. FIG. 4 shows one embodiment of intrusion information within the intrusion database.

At step 2606, fraud information is received such as from a network, as the output of software designed to detect fraud, from a fraud detection system, switching system, network management system, security information manager, or from any other source. In one embodiment, the fraud information may include a description of the suspected fraud and one or more telephone numbers suspected of either originating the fraud or the number where the fraud terminates. At step 2608 and upon receipt of the fraud information, it is stored in a fraud database. FIG. 23B shows one embodiment of fraud information within the fraud database.

Returning to FIG. 26, at step 2614 location information is obtained for the information stored in the intrusion database and the fraud database. This process has previously been described for fraud information involving PSTNs in reference to FIGS. 22B and 23A. In regard to threat information, VoIP, and other Internet-facilitated communications, computing device 2202 retrieves, for computers (or network points) at which a threat or telephone call started or ended, CDR information for that computer (or network point) from an CDR database in instances in which the network address of the computer at which the threat started or ended comprises an IP address. In one embodiment, the threat or call information (such as the IP address) maybe used as a key to retrieve the appropriate record from CDR database. The CDR information may include wireless location data associated with the network point at which the threat or call started or ended, as necessary. FIG. 5 shows one exemplary embodiment of the CDR information within the CDR database.

In instances in which the CDR information identifies a cellular tower or other fixed network entity as servicing the call but does not provide more specific GPS data, at step 2616 computing device 2202 may also retrieve geographic location information for the cellular tower or other fixed network entity, from location database 2212, 2232. As above, this process has already been described in relation to an embodiment in which the threat data includes a network address, such as an IP address, of the computer at which the threat started or ended, however, the fraud information may provide a telephone number of a device involved in a call that is being investigated for fraud. In this instance, a customer database may be consulted to determine an address or other physical location associated with the telephone number. In either instance, the resulting location information may include such information as the physical location (e.g., mailing address or GPS coordinates) for the identified network point or computer.

Once the location information has been retrieved from databases for the intrusion and fraud events, it is stored in a map database at step 2618. Within map database the retrieved information is preferably correlated such that all information for a particular intrusion, fraud or other threat is stored in a record for that intrusion. For example, FIG. 23E shows exemplary database entries of records of map information for mapping fraud events, such as may be stored in map database and FIG. 7 shows exemplary database entries of records of map information for mapping intrusion events, such as may be stored in map database. As shown in FIG. 7, map database records for intrusion events may contain the intrusion information, the network address (such as the IP address from CDR database), and the physical location, such as the mailing address or GPS information (also from CDR database or from location database). It is to be appreciated that location information for any information in the map database may be in the form or coordinates or as a described address or location. In addition, map database intrusion records may also include a status of the intrusion and an indication of the response person or team assigned to respond to the intrusion and map database fraud records may contain a description or code that identifies the fraud event that occurred or is suspected to have occurred.

Upon correlating this information within map database, computing device then maps the location of the intrusion, fraud or other threat at step 2618. In one embodiment, the location information for each record is imported into a commercially available mapping program such as, for example, MapPoint™ by Microsoft, to visually locate the intrusion, fraud and physical crime points on a map. The process ends at step 2620.

Figure 27A:
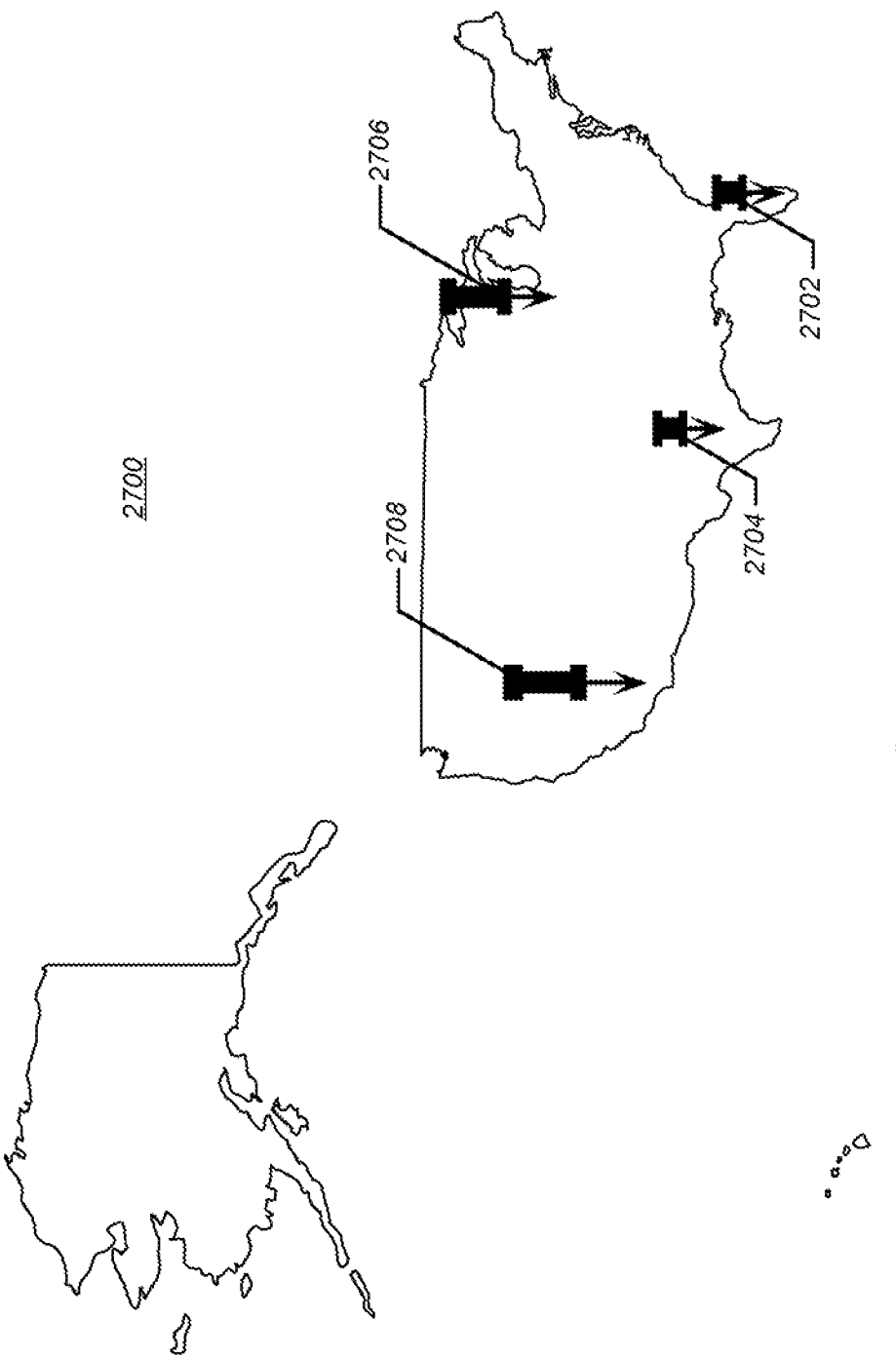
FIG. 27A is an exemplary map using push-pin icons of varying size according to the present invention.
Figure 27B:
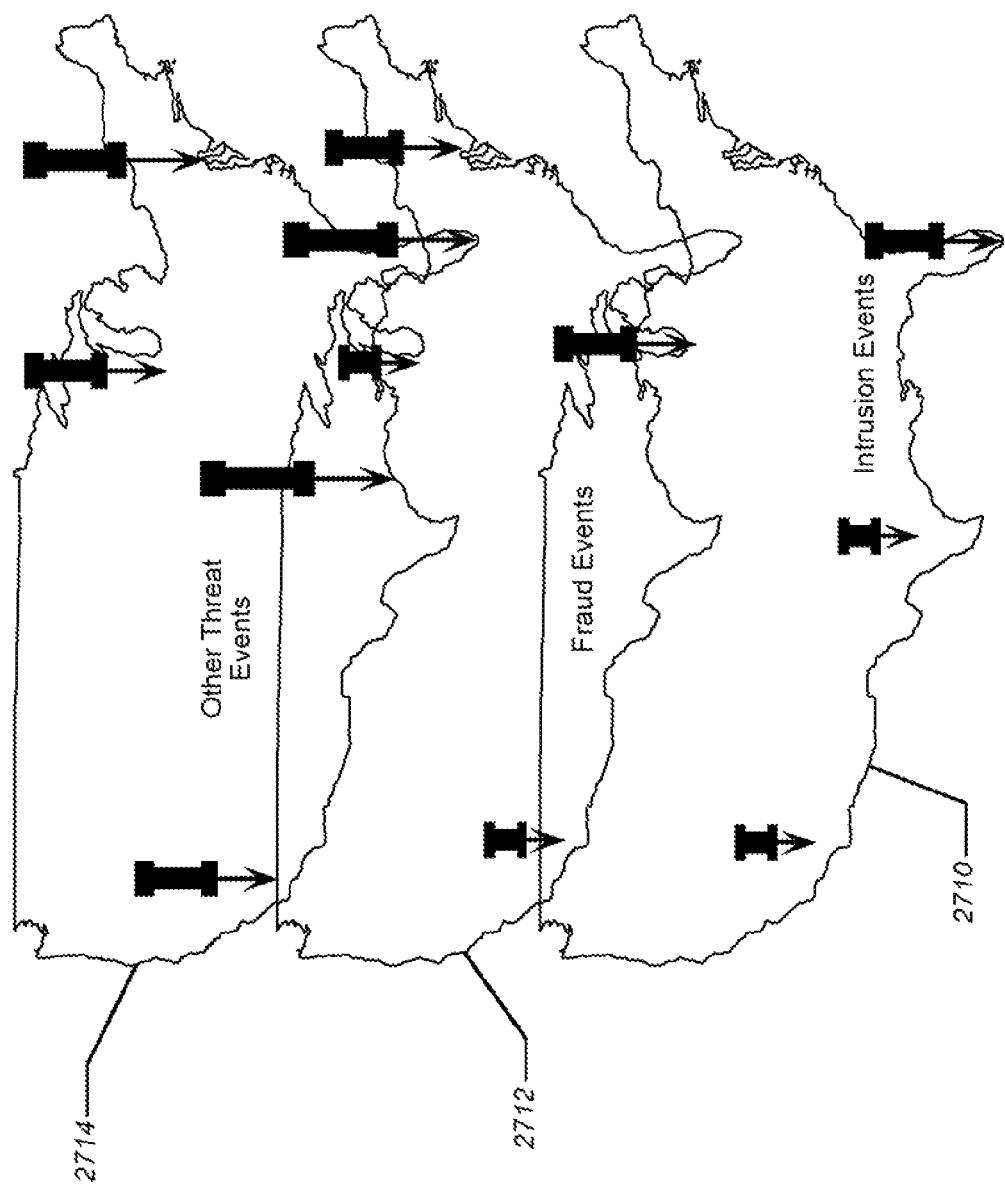
FIG. 27B is an exemplary mapping embodiment according to the present invention where push-pin icons of varying size are used in each layer to represent areas/locations of events and the size of the push-pin icon represents the magnitude of the mapped event.
Figure 27C:
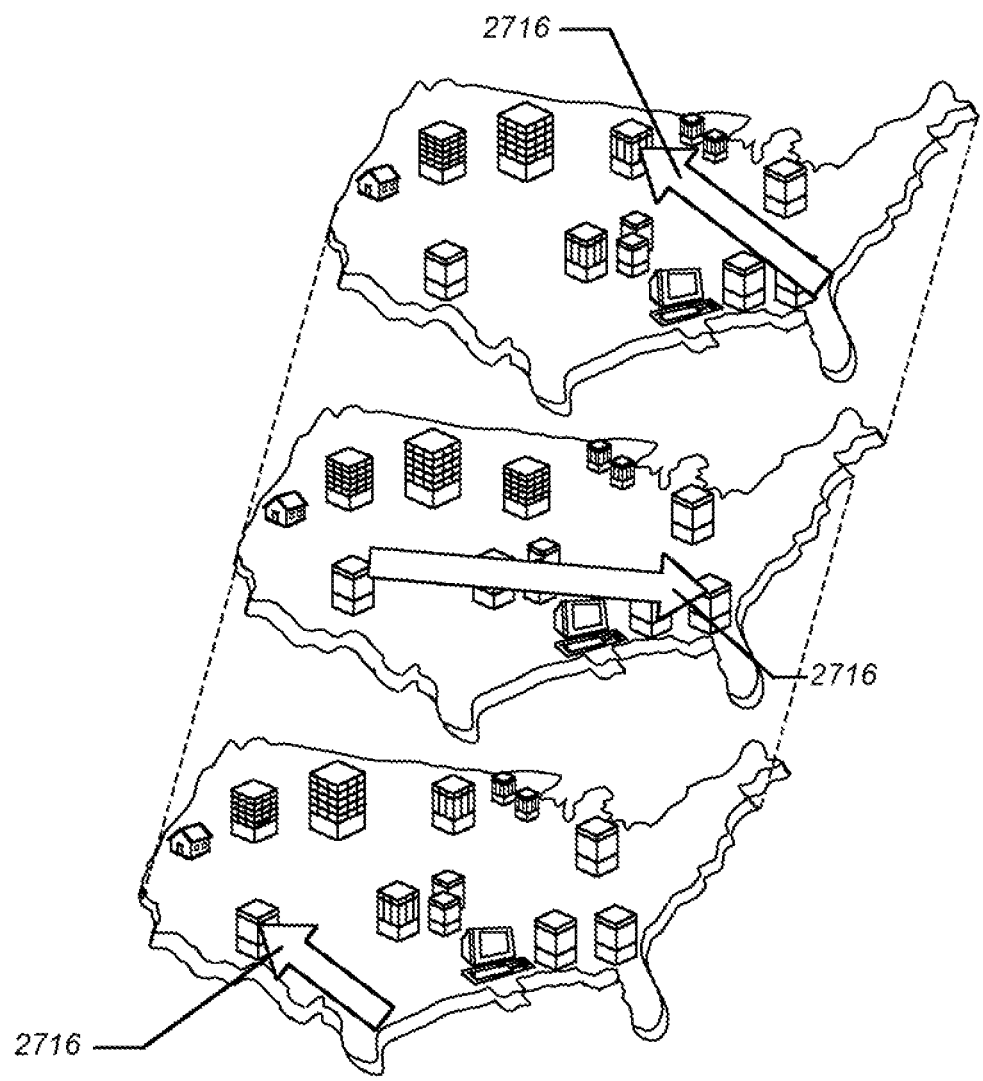
FIG. 27C is another alternate embodiment according to the present invention of mapping crime events.
Figure 27D:
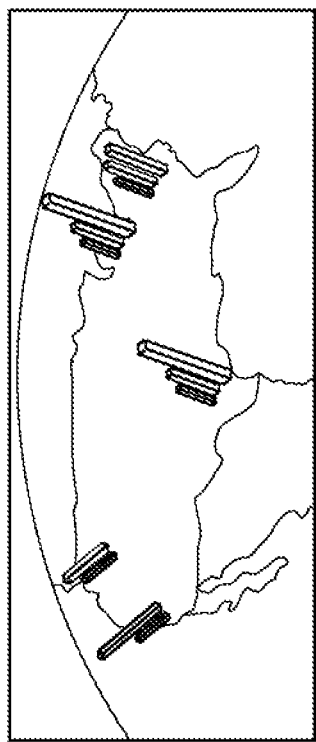
FIG. 27D is yet another embodiment according to the present invention where areas of activity related to mapped events are shown as 3-dimensional raised areas relative to the rest of the map to illustrate the magnitude of activity.

In one embodiment, the map may represent each of the events as a symbol on the map, for example, as a push pin. In one instance, different colored push-pins may be used to represent various threats such as intrusions, fraud and vulnerabilities, respectively. It is also contemplated that different symbols may be used to represent different events (e.g. intrusions, fraud, vulnerabilities), and in one embodiment different colors may be used for the different symbols to represent the severity of the event or the size of the pushpin or other symbol may be used to represent the cumulative crime risk. An exemplary map 2700 using this push pin of varying size approach is shown as FIG. 27A. Within map 2700, each pushpin 2702, 2704, 2706, 2708 shows risks associated with intrusion, fraud and other threats and the size of the pushpin represents the cumulative risk of those events at those locations. FIG. 27B is an alternate embodiment where the various events each have their own layer. For instance, a first layer 2710 illustrates events associated with intrusions, a second layer 2712 illustrates events associated with frauds, and a third layer 2714 illustrates events associated with other threats. In the embodiment of FIG. 27B, push-pins of varying size are used in each layer to represent areas/locations of intrusion, fraud and physical crime activity while the size of the push-pin represents the magnitude of the respective activity. FIG. 27C is another alternate embodiment of mapping threats. In FIG. 27C, layers are once again used to represent each event type (e.g., intrusion, fraud and other threats), yet FIG. 27C includes the added element of arrows 2716 or other means of indicating the origination and termination of the mapped activities. FIG. 27D is yet another embodiment where areas of activity related to the mapped events are shown as 3-dimensional raised areas relative to the rest of the map to illustrate the magnitude of activity.

Using one or more maps such as those shown in FIGS. 27A, 27B, 27C and 27D, response teams or system administrators will be able to identify "pockets" of fraud, intrusions vulnerabilities and other threats and will be able to better prioritize and more efficiently schedule response personnel to respond and mitigate or eliminate the events, based on geographic location. In addition, by continually updating the map and watching it change over time, system operators will be able to geographically view the spread, if any, of the monitored events. Furthermore, by also tracking system updates, the administrator will be able to identify new entry points, areas of likely activity, and trends for such activities, all of which may be useful for decision-making and planning purposes.

Figure 28:
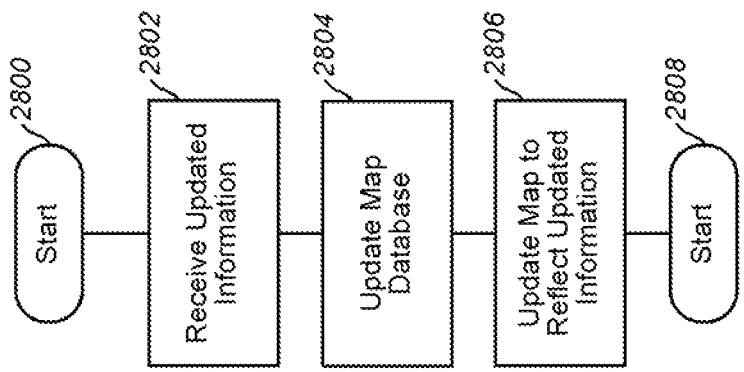
FIG. 28 is an exemplary flowchart of a process for updating a geographic map with progress information in an embodiment according to the present invention.

FIG. 28 shows a flowchart of a process for updating the geographic map with progress information. The process begins at step 2800. At step 2802 a response team, system administrator, etc. sends an update to the system to advise of a new status of a intrusion, fraud or physical crime. For example, the response team may advise the system that an intruded computer must be replaced, and be rendered inactive until it is replaced, (i.e., the intrusion is "open") or may advise the system that the intruded computer has been upgraded and is no longer compromised. Likewise, police and government agencies may provide updates on criminal investigations (open, suspect arrested, inactive, etc.), and the status of fraud events may also be updated to indicate whether the fraud events have ceased, whether preventative actions have been taken, etc.

Once this information is received, at step 2804 the map database record for the identified threat is updated. For example, each record in the map database may contain a field to identify the status of the event. Possible status indicators may reflect that the threat is "new," "open" (i.e., not yet responded to), "assigned to a response team," "closed" (i.e., responded to and fixed), or any other status that may be of use to the organization for which the system has been implemented.

Once the map database record has been updated, at step 2806 the computing device can update the map to reflect the updated status of the events. For example, one way that map can show the status information is to display color-coded push pin symbols to reflect the status. In one embodiment, a red push pin may signify an "open" or "new" threat, a yellow push pin may signify an event that has been assigned, but not yet fixed, and a green push pin may signify a closed event. By mapping this information together with the locations of the threats, administrators can better track the progress of their response teams, and more fluidly schedule responses to new events as they arise.

Any symbol or representation may be used to identify events on the map, including, but not limited to, a push-pin symbol. These symbols and representations may be used to identify the quantity of threats in that area of the map, such as by varying the color of the symbol to identify such quantity. In addition, the symbol or representation may be linked to the underlying data such that a user, using an input device, may select a symbol on the map causing the computing device to display the status, quantity, address, or other information corresponding to the selected symbol. The process of FIG. 28 ends at step 2808.

While the preferred embodiments implemented consistent with the present invention have been described herein, other embodiments may be implemented consistent with the present invention as will be apparent from consideration and practice of the preferred embodiments described in this specification. It is intended that the specification and examples described herein be considered as exemplary only, with a true scope and spirit of the invention being indicated by the following claims.

What is claimed is:

1. A processor-implemented method, comprising:
receiving threat data comprising at least a description and time of occurrence of a threat and at least one or more of a network address associated with the threat;
receiving threat response data associated with the received threat data;
determining via a processor location data associated with the network address, wherein determining location data includes determining wireless call location data associated with the network address;
correlating via the processor the threat data with the location data to generate map data;
dynamically updating the generated map data with the received threat response data; and
generating a map displaying a geographical location of the threat and associated threat response based on the dynamically updated map data.

2. The method of claim 1, wherein the threat data further comprises a destination network address, and a threat name.

3. A processor-implemented method, comprising:
receiving threat information about a threat, wherein said threat information comprises a description of the threat and at least one telephone number;
receiving threat response information associated with the threat;
correlating via a processor the threat information with wireless call location information to determine at least one physical location associated with the threat;
dynamically updating the correlated threat information with the received threat response information; and
generating a map displaying a geographical location of the at least one physical location associated with the threat and associated threat response based on the dynamically updated threat information.

4. The method of claim 3, wherein correlating the threat information with wireless call location information to determine at least one physical location associated with the threat comprises electronically correlating the at least one phone number with at least one of an inventory database and a billing database to determine the at least one physical location associated with the threat.

5. The method of claim 3, wherein correlating the threat information with location information to determine at least one physical location associated with the threat comprises electronically correlating the at least one phone number with wireless call location data from a wireless telecommunication system, wherein said wireless call location data indicates the approximate physical location of a wireless handset having said at least one telephone number when said threat occurred.

6. The method of claim 3, wherein receiving threat information about a threat comprises receiving from a threat detection system that electronically reviews call detail records a description of the threat and at least one telephone number.

7. The method of claim 3, wherein generating a map displaying a geographical location of the at least one physical location associated with the threat comprises electronically generating a map with a computing device and mapping software and electronically displaying on a display device a computer-generated icon that shows the geographical location of the at least one physical location associated with the threat.

8. The method of claim 3 further comprising:
receiving threat information identifying a point in a network at which a threat has occurred;
correlating the threat information with location information for the identified network point; and
displaying a geographical location of the identified network point on the map.

9. The method of claim 8, wherein displaying a geographical location of the identified network point on the map comprises electronically generating a map with a computing device and mapping software and electronically displaying on a display device a computer-generated icon that shows the geographical location of the at least one physical location associated with the threat and the identified network point.

10. A processor-implemented method, comprising:
receiving fraud information about a fraud event, wherein said fraud information comprises a description of the fraud event and at least one telephone number;
receiving intrusion information identifying a point in a network at which an intrusion has occurred;
receiving intrusion response information associated with the intrusion;
correlating via a processor the intrusion information with wireless call location data for the identified network point;
correlating via the processor the fraud information with location information to determine at least one physical location associated with the fraud event;
dynamically updating the correlated intrusion information with the received intrusion response information; and
generating a map displaying in layers a geographical location of the at least one physical location associated with the fraud event, and a geographical location of the identified network point based upon the wireless call location data and associated intrusion response based on the dynamically updated intrusion information.

11. The method of claim 10, wherein correlating the fraud information with location information to determine at least one physical location associated with the fraud event comprises electronically correlating the at least one telephone number with at least one of an inventory database and a billing database to determine the at least one physical location associated with the fraud event.

12. The method of claim 10, wherein receiving fraud information about a fraud event comprises receiving from a fraud detection system that electronically reviews call detail records a description of the fraud event and at least one telephone number.

13. The method of claim 10, wherein generating a map displaying in layers a geographical location of the at least one physical location associated with the fraud event and a geographical location of the identified network point comprises electronically generating a map with a computing device and mapping software and electronically displaying on a display device computer-generated icons that show the geographical location of the at least one physical location associated with the fraud event and the geographical location of the identified network point.

14. A system comprised of:
a threat detection system configured to:
electronically review call detail records and identify suspected threats by creating threat information;
a location engine configured to:
receive said threat information from said threat detection system;
receive threat response information associated with the received threat information;
correlate said threat information with one or more physical locations based on wireless call location data derived from the threat information;
dynamically update the correlated threat information with the received threat response information; and
an electronic mapping system configured to:
receive at least said one or more physical locations from said location engine;
map said one or more physical locations on an electronic map; and
display the electronic map showing said one or more physical locations and associated threat response based on the dynamically updated threat information on a display device.

15. The system of claim 14, wherein said threat information is comprised of at least a portion of one or more telephone numbers.

16. The system of claim 15, wherein correlating said threat information with one or more physical locations comprises using said at least a portion of one or more telephone numbers correlated against a location database to determine said one or more physical locations.

17. The system of claim 16, wherein the location database is comprised of at least one of an inventory database and a billing database.

18. The system of claim 14, wherein said one or more physical locations are provided as one of street addresses, latitude and longitude, horizontal and vertical coordinates, or combinations thereof.

19. The system of claim 14 wherein said intrusion detection system is further configured to electronically review network information and identify one or more threat points in a network,
wherein the location engine is configured to receive said one or more threat points from said threat detection system and correlate said one or more threat points with location information for each of the one or more threat points and said electronic mapping system is configured to receive said location information for said at least said one or more threat points from said location engine and map said location information for said one or more threat points on the electronic map that is displayed on the display device.

20. A system comprised of:
a fraud database comprised of fraud information associated with one or more fraud events;
an intrusion database comprised of intrusion information associated with one or more intrusion points in a network;
a location engine configured to:
  retrieve said fraud information from said fraud database and said intrusion information from said intrusion database;
  retrieve intrusion response information associated with the received intrusion information;
  correlate said fraud information and said intrusion information with one or more physical locations based on wireless call location data associated with said fraud information and said intrusion information;
a mapping database configured to:
  receive at least said one or more physical locations from said location engine to form mapping information;
  dynamically update the mapping information with the retrieved intrusion response information; and
an electronic mapping system map that is configured to retrieve said dynamically updated mapping information from said mapping database and display said one or more physical locations of said fraud events, intrusion points and associated intrusion response on an electronic map that is displayed on a display device.

21. The system of claim 20, wherein said fraud information is comprised of at least a portion of one or more telephone numbers.

22. The system of claim 21, wherein correlating said fraud information with one or more physical locations comprises using said at least a portion of one or more telephone numbers correlated against a location database to determine said one or more physical locations.

23. The system of claim 22, wherein the location database is comprised of at least one of an inventory database and a billing database.

24. The system of claim 20, wherein said intrusion information is comprised of at least a portion of one or more network addresses.

25. The system of claim 24, wherein correlating said intrusion information with one or more physical locations comprises using said at least a portion of one or more network addresses correlated against a location database to determine said one or more physical locations.

* * * * *